(12) United States Patent
Nicot

(10) Patent No.: US 6,427,542 B1
(45) Date of Patent: Aug. 6, 2002

(54) TORQUE SENSOR AND STEERING COLUMN PROVIDED WITH SUCH A SENSOR

(75) Inventor: Christophe Nicot, Epagny (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/243,842

(22) Filed: Feb. 3, 1999

(30) Foreign Application Priority Data

Feb. 4, 1998 (FR) .............................. 98 01295

(51) Int. Cl.[7] .......................... G01L 3/14; H02K 17/32; B62D 5/06
(52) U.S. Cl. ............... 73/862.326; 73/862.08; 73/862; 318/433; 180/422
(58) Field of Search .................. 73/862.08, 862.11, 73/862.12, 862.19, 862.29, 862.322, 862.041–862.046; 180/422; 318/433

(56) References Cited

U.S. PATENT DOCUMENTS 5,009,110 A * 4/1991 Lang et al. ............ 73/862.322
5,731,529 A   3/1998 Nicot

FOREIGN PATENT DOCUMENTS

| EP | 0442 091 A1 | 12/1990 |
| FR | 2 478 004 | 9/1981 |

* cited by examiner

*Primary Examiner*—Benjamin R. Fuller
*Assistant Examiner*—Andre Allen
(74) *Attorney, Agent, or Firm*—John C. Bigler; Glenn M. Massina

(57) ABSTRACT

Two external rings and an internal ring form an assembly that is connected to a column so it rotates with it, to which column the torque to be measured is applied. Elastically deformable members connect the internal ring to one external ring, and the other external ring remaining essentially unstressed. A measurement device, such as, for example, a probe having at least one with Hall effect device, measures relative displacement of the two external rings to determine the torque applied. The invention also concerns the steering devices equipped with such torque sensors, for example, for power or assisted steering.

35 Claims, 30 Drawing Sheets

TORQUE SENSOR AND STEERING COLUMN PROVIDED WITH SUCH A SENSOR

BACKGROUND OF THE INVENTION

This invention relates generally to the technical field of torque sensors and, more particularly, to torque sensors that can be used, for example, in assisted steering systems of vehicles.

These power steering or assisted steering systems can be of the following different conventional types: pneumatic, hydraulic, hydrostatic, electrical, or electrohydraulic, depending on the type of energy used. The power steering systems conventionally comprise a torque sensor or torque meter, which is mounted in relation with the steering device of the vehicle. This torque meter generates a signal which indicates the braking torque applied by the driver, conventionally by means of the steering wheel, on the steering device of the vehicle. The output signal of the sensor is conventionally addressed to a steering assistance computer which triggers the power assistance, by actuating, for example, an electrical motor, in the case of electrical power steering. Most of the torque metering devices comprise a torsion bar connecting to half shafts. Guides are provided to avoid the effects of interfering bending forces.

It is known that torque applied by pure torsion to a solid cylindrical bar with circular cross section, made of a material with a Young's modulus E and a Poisson coefficient $\mu$ results in an isotropic linear elasticity of:

$$\Gamma = \frac{E}{2(1+\mu)} \frac{\pi d^4}{32} \frac{\theta}{L}$$

where d is the diameter of the bar, L the length of the bar and $\theta$ the torsion angle. Consequently, the fact of forming an area with reduced cross section in a steering column allows a concentration of torsional deformation in this area, which is used for measuring the torque.

Examples of torque meters with a torsion bar for power steering are described in the following documents: WO-97 08 527, EP-453,344, EP-325,517, and FR-2,738,339 originating from the applicant; as well as in the following documents:

Japanese patent applications published under Nos. JP-50 77 743, JP-57 19 81 71, JP-59 07 58 64, JP-57 08 77 62, JP-59 11 85 77, JP-61 14 674, JP-62 13 43 71, JP-62 09 44 70, JP-63 29 037, JP-63 09 36 73, JP-30 79 473;

European patent applications published under Nos. EP-369,311, EP-396,895, EP-418,763, EP-515-052, EP-555,987, EP-562,426, EP-566,168, EP-566,619, EP-652,424, EP-638,791, EP-673,828, EP-681,955, EP-728,653, EP-738,647, EP-765,795, EP-738,648, EP-770,539, EP-802-107;

International PTC patent applications published under Nos. WO-87/02 319, WO-92/20 560, WO-95/19 557, WO-96/06 330;

French, UK and U.S. Patent applications published under the following Nos.: GB-2,306,641, FR-2,705,455, U.S. Pat. Nos. 4,874,053, 4,907,668, 4,984,474, 5,123,279, 5,394,760, 5,515,736, 5,578,767, 5,585,573, 5,616, 849, 5,641,916.

The principal methods for measuring the torque of a rotating shaft, with or without torsion bar, are methods based on an electromagnetic phenomenon, on optical methods, and on electrical methods. The magnetic methods essentially use magnetostriction and the Hall effect. Magnetostriction is defined as the reversible mechanical deformation which accompanies the variation in the magnetization of a ferromagnetic solid. This phenomenon is reversible; that is, a deformation applied to a ferromagnetic material placed in a magnetic field causes a variation in the magnetization (converse magnetostriction). The Hall effect is conventionally defined as the production of an electrical field which is normal with respect to the current density vector in a conductor or semiconductor placed in a magnetic induction field which is normal with respect to the current density vector.

Examples of torque meters which use magnetostriction are described in the following documents: EP-651,239, EP-502,722, EP-288,049, U.S. Pat. Nos. 4,774,464, 5,450, 761, 4,933,580, 4,939,435, 3,548,649, 3,587,305. Sensors which use the Hall effect are described in the following documents: FR-2,737,010, FR-2,689,633.

Optical methods for measuring torque are essentially associated with phenomena of interference or the measurement of optical density. Reference can be made, for example, to the following documents: EP-555,987, U.S. Pat. Nos. 5,490,450, 4,676,925, 4,433,585, 5,001,937, 4,525, 068, 4,939,368, 4,432,239, FR-2,735,232, FR-2,735,233, WO-95/19 557.

Electrical methods for measuring torque are essentially connected with the capacitive measurement or a measurement of the phase difference between two magnetic encoders which are mounted circumferentially with respect to the axis of torsion. The document FR-2,724,018 pertains to a torque sensor which comprises a device with gauges for measuring elongation. This device with gauges is placed on a measurement body, which is subjected to mechanical tension under the action of a torque. The document EP-442,091 describes an installation for measuring the angle of rotation or the torque of a rotating or fixed element of a machine, comprising a torsion element in the form of a wheel with spokes connected to several measuring elements, at least one spoke of the wheel with spokes being cut so that the parts of the spoke(s) are applied against each other during the displacement by a predetermined flexion of the other spokes. The measuring device uses Foucault currents.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a torque sensor comprising a first external ring having at least one elastically deformable connection means, a second external ring placed at a distance from the first external ring, and an internal ring, connected to a rotatable column so the internal ring rotates with the column. The first external ring is capable of being connected to a torque means for applying torque to be measured to the column, and the first external ring is connected to the internal ring by the elastically deformable connection means. The second external ring is connected to the internal ring by at least one essentially unstressed means. Measurement means, for measuring a displacement of the first external ring with respect to the second external ring when a torque is applied to the column by the torque means, is mounted on the second external ring for rotation with the column.

The foregoing and other aspects will become apparent from the following detailed description of the invention when considered in conjunction with the accompanying drawing figures.

BRIEF DESCRIPTION OF THE DRAWING FIGURES

FIG. 8a is a sectional view along line VIII—VIII of FIG. 7a;

FIG. 23 is a left side view and FIG. 24 is a top view;

FIG. 27 is a detail of FIG. 26;

DETAILED DESCRIPTION

Figure 1:
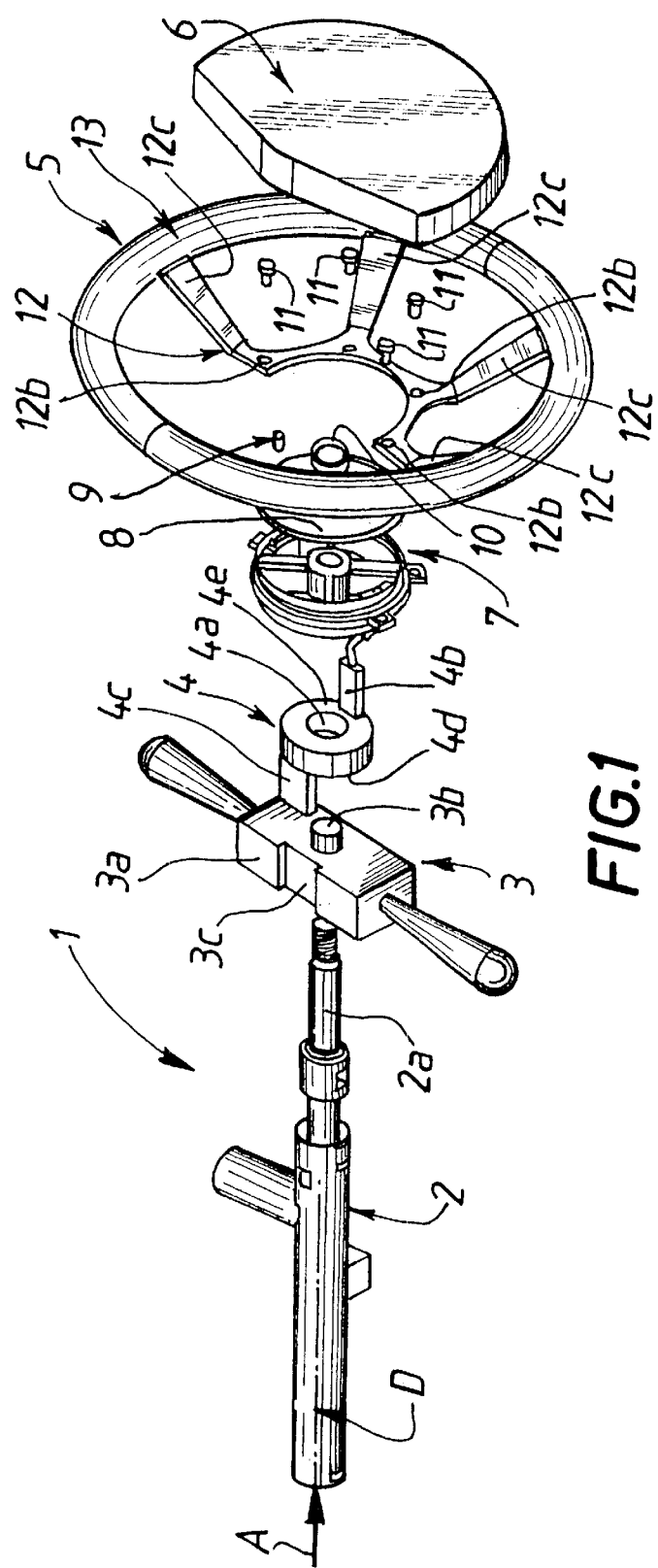
FIG. 1 is an exploded perspective view of a steering device for a vehicle, illustrating the torque sensor and steering column of the present invention.

Referring now to the drawings, FIG. 1 illustrates a steering device 1, intended to be integrated in a vehicle, for example a car, comprising a steering column 2 that can optionally be telescopic and/or with variable inclination with respect to the car body and the driver. A control assembly 3, under the steering wheel, comprises a central block 3a having a hole 3b such that the control assembly 3 can be adjusted on an end part 2a of the transmission shaft of the steering column 2. In this embodiment, the end part 2a has a cross section which is essentially circular, and the hole 3b is also circular in cross section, i.e., perpendicularly with respect to axis D of the steering device 1.

Figure 2:
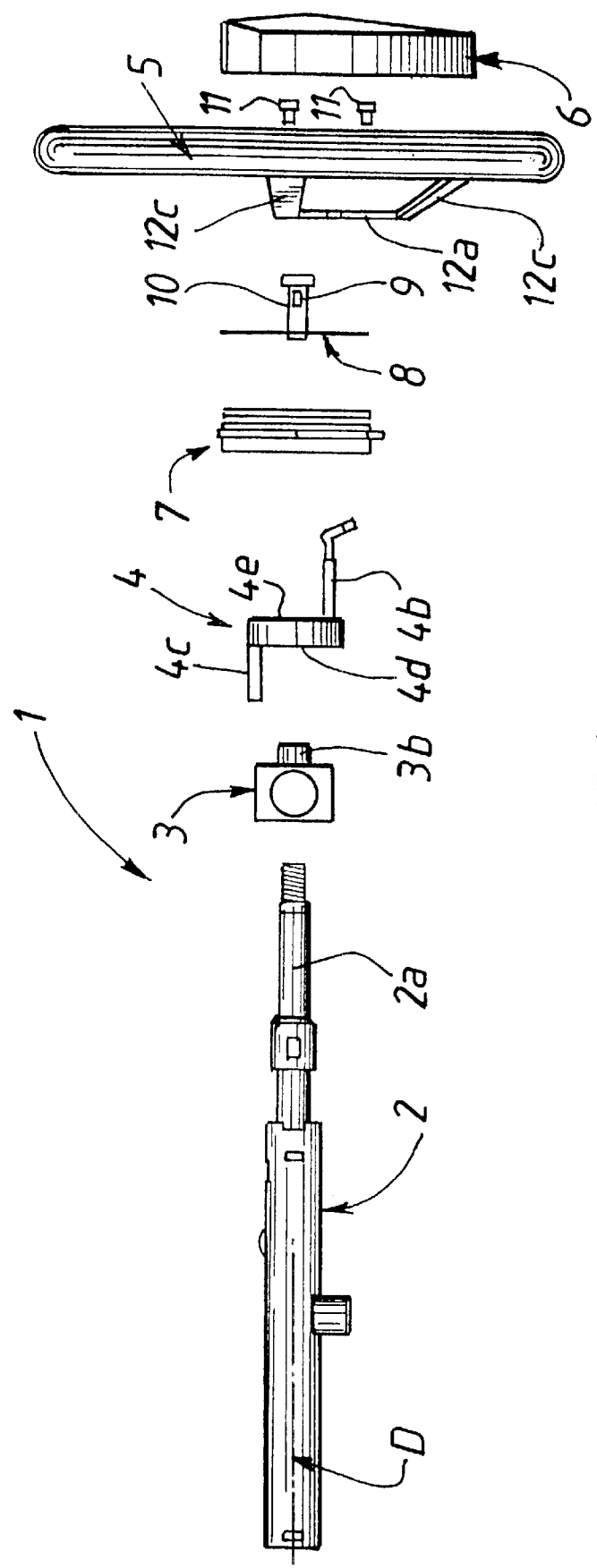
FIG. 2 is a lateral exploded view of the steering device of FIG. 1.
Figure 3:
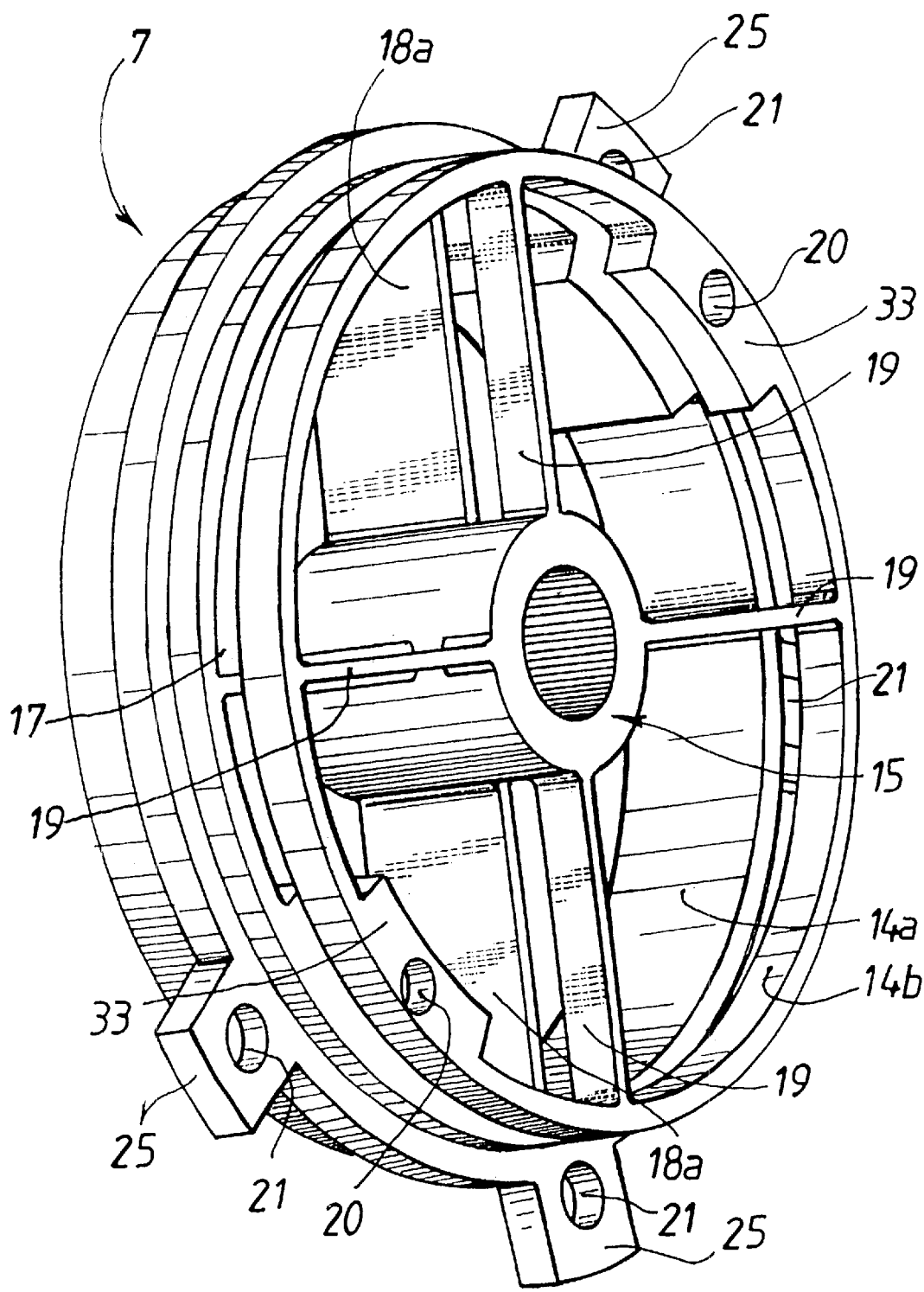
FIG. 3 is a perspective view of a hub with test body illustrating an embodiment of the present invention.

The steering device 1 comprises a rotating connector 4, fitted with two spindles 4b, 4c and a central perforating hole 4a. In FIGS. 1 and 2, the spindles 4b and 4c are arranged essentially parallel to the axis D and have a parallelepiped shape. The spindle 4c projects from the back transverse face 4d of the rotating connector 4, and the spindle 4b projects from the front transverse face 4e of the rotating connector 4. The spindle 4c is intended to be maintained in position in a groove 3c provided on the central block 3a of the control assembly 3 under the steering wheel.

The steering device 1 comprises a torquemeter whose test body is integrated in the hub 7 of the steering wheel 5. Optionally, as shown in FIGS. 1 and 2, the steering wheel 5 includes, in its central part, an inflatable safety bag housing 6. In this case, the rotating connector 4 can be used both for the electrical connections of the inflatable bag housing 6 and for the connection between the electronic circuit 8 of the power steering torquemeter and the means of assistance (electrical motor, control device for the hydraulic circuit, etc.). In the other embodiment, the steering device 1 does not include an inflatable bag housing. The steering wheel 5 comprises a rim 13 and a reinforcement 12.

The reinforcement 12 is in the form of a transverse arch 12a connected to the rim 13 by four inclined arms 12c. The transverse arch 12a is perforated by holes 12b that allow the insertion of screws 11 for attachment of the hub 7 to the steering wheel 5. In a first embodiment of hub 7, illustrated in FIGS. 3 through 9, the hub 7 comprises a test body utilizing flexion to measure torque. The hub 7 comprises a cylindrical internal ring 15 and two external rings 14a, 14b connected, respectively, to the internal ring 15 by beams 18a of external ring 14a that can be elastically deformed in flexion and beams 19 of external ring 14a that are not deformed. More precisely, the back external ring 14a, attached to hub 7 of the steering wheel 5 by screws 11 passing through holes 21, is connected to the internal ring 15 through the intermediary of beams 18a of external ring 14a that can be elastically deformed in flexion. The external rings 14a, 14b are essentially coaxial and have the same mean diameter.

In the embodiment illustrated, the deformable beams 18a are four in number, and they are regularly distributed perpendicularly to the axis D. In other embodiments, not illustrated, the deformable beams are two, three or more than four in number. The front external ring 14b is connected to the internal ring 15 by means of radial undeformed beams 19. In the embodiment illustrated, these undeformed beams 19 are present in the same number as the beams 18a that are elastically deformable in flexion. The beams 18a, 19 are located essentially along two radial planes perpendicular to the axis D.

In other embodiments, not illustrated, the beams 19 are two, three or more than four in number, the number of beams 18a being four. In some embodiments, the number of beams 18a is different from four and different from the number of beams 19. In other embodiments, the number of beams 18a is equal to the number of beams 19, and this number is different from four. The beams 18a, 19 can be, as illustrated, arranged essentially vertically with respect to each other, along common radial planes, or the beams 19 may be arranged along radial planes that are shifted with respect to the radial planes of the beams 18a. In some embodiments, the external ring 14b is connected to the internal ring 15 by an annular sheeting.

Figure 5:
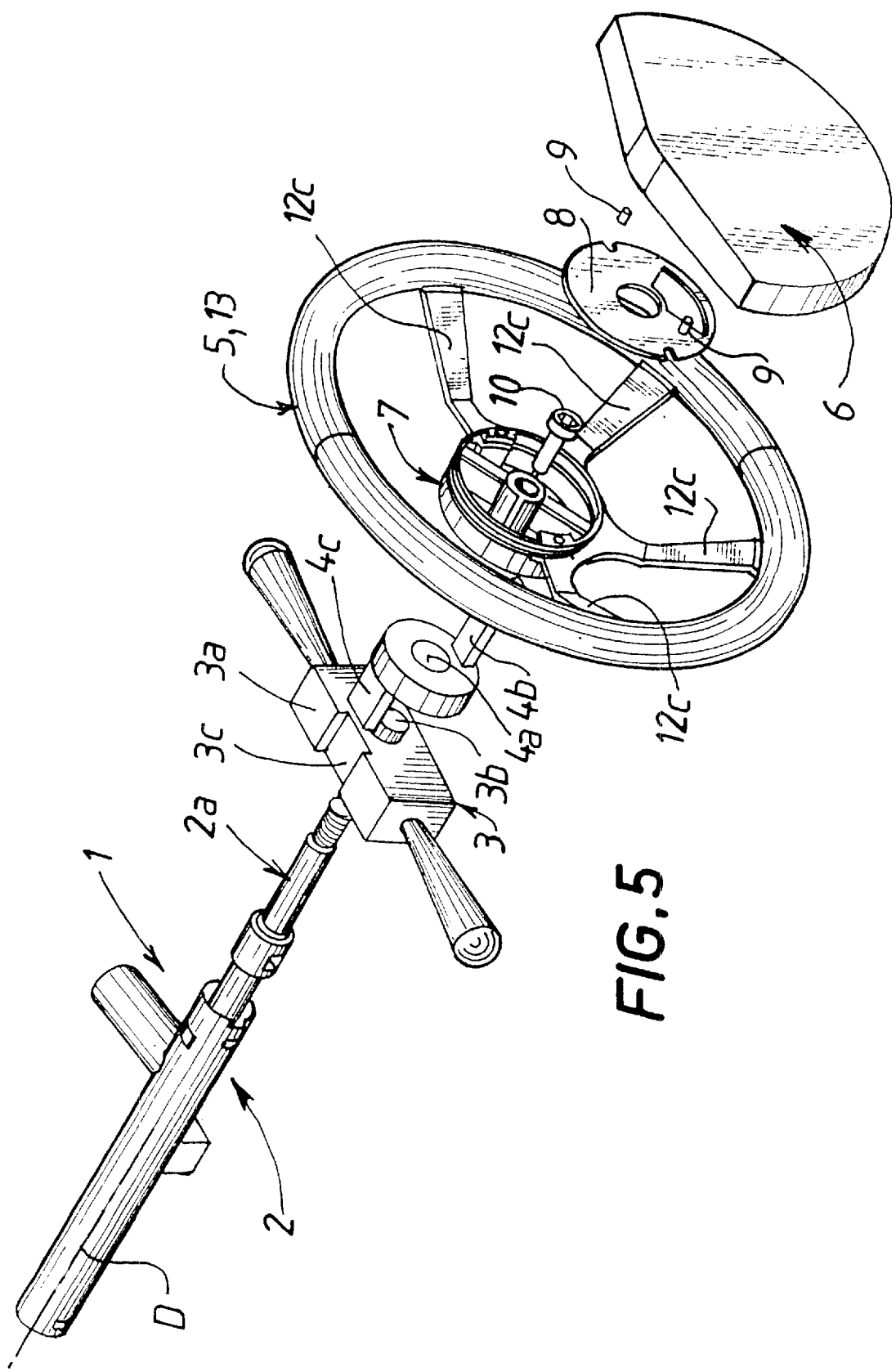
FIG. 5 is a view similar to FIG. 1, illustrating a hub with test body being mounted so it forms one piece with the steering wheel.
Figure 6:
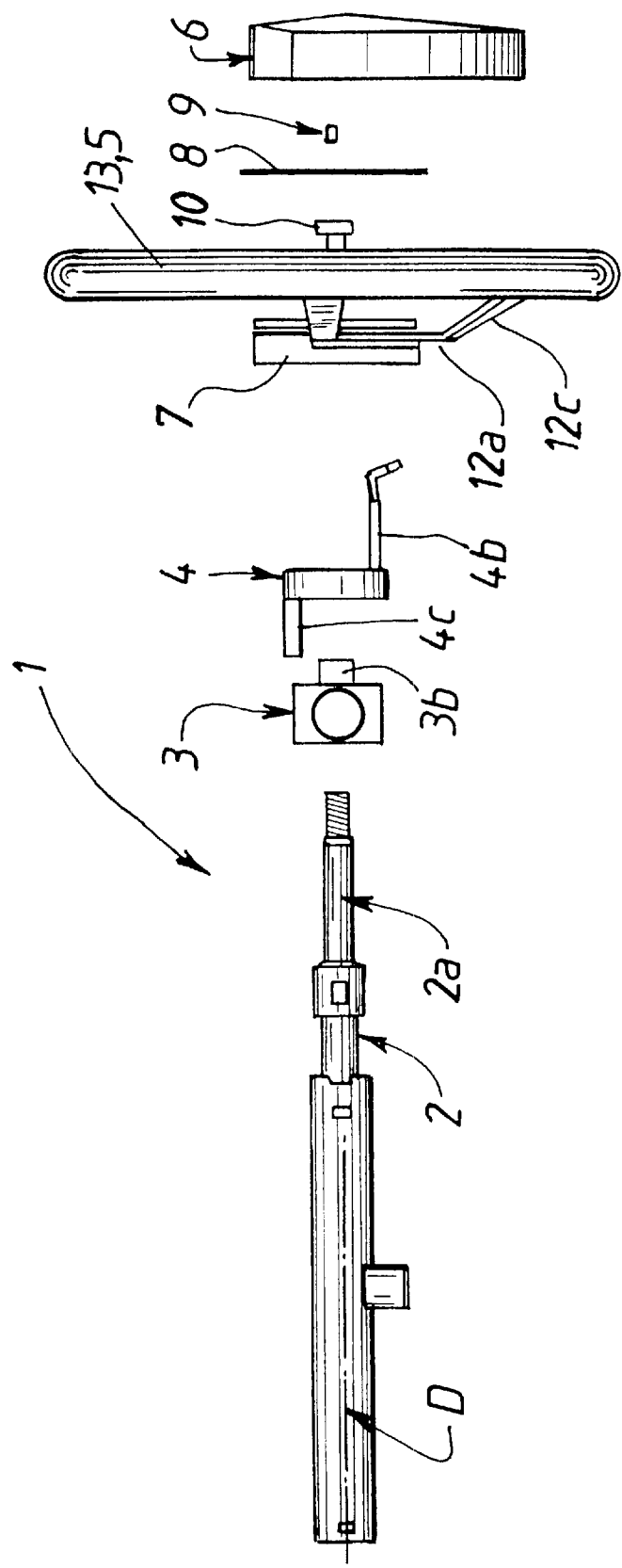
FIG. 6 is a lateral exploded view, of the steering devise of FIG. 5.
Figure 7A:
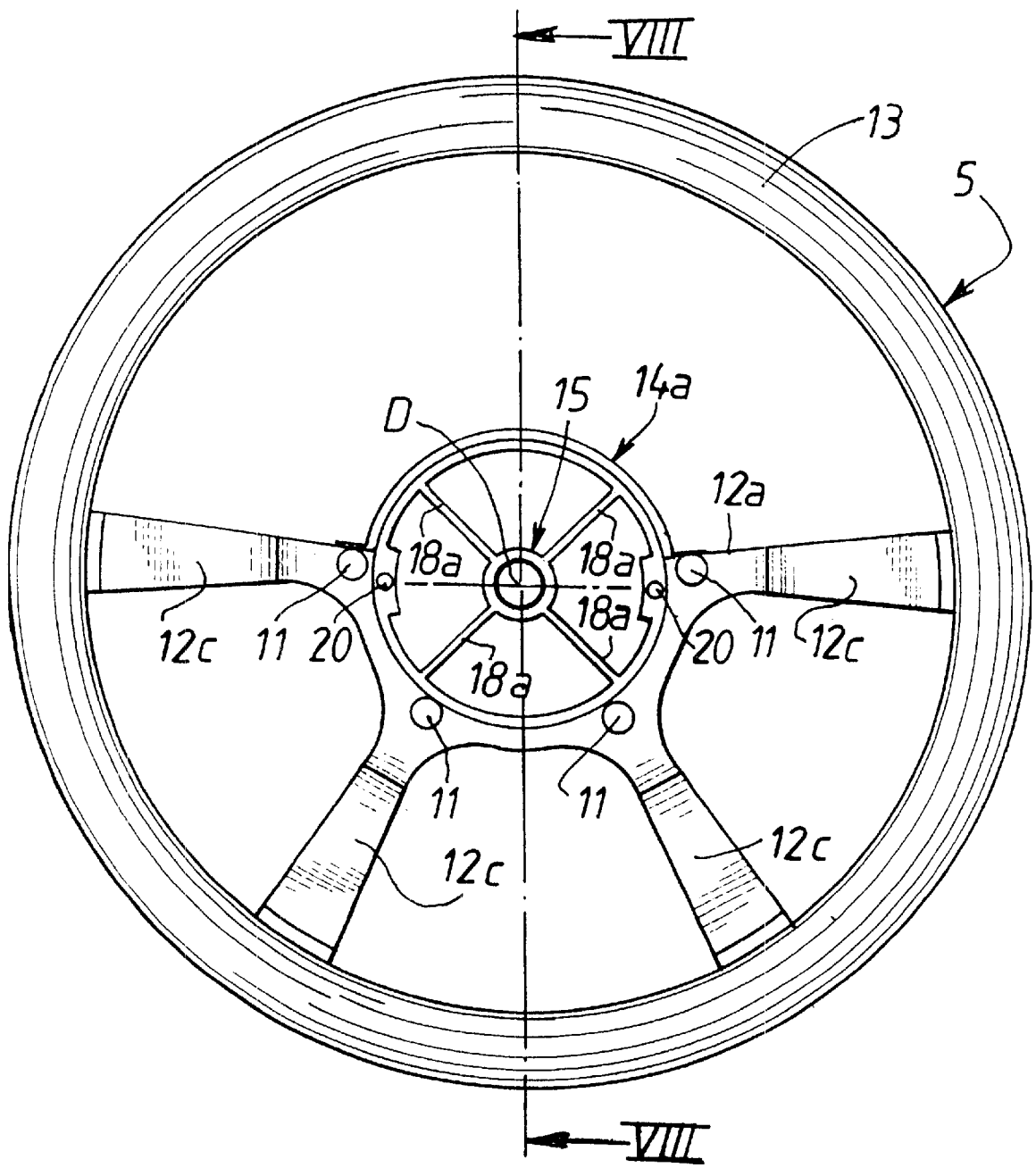
FIG. 7a is a frontal view of the steering wheel assembly of FIG. 1.
Figure 7B:
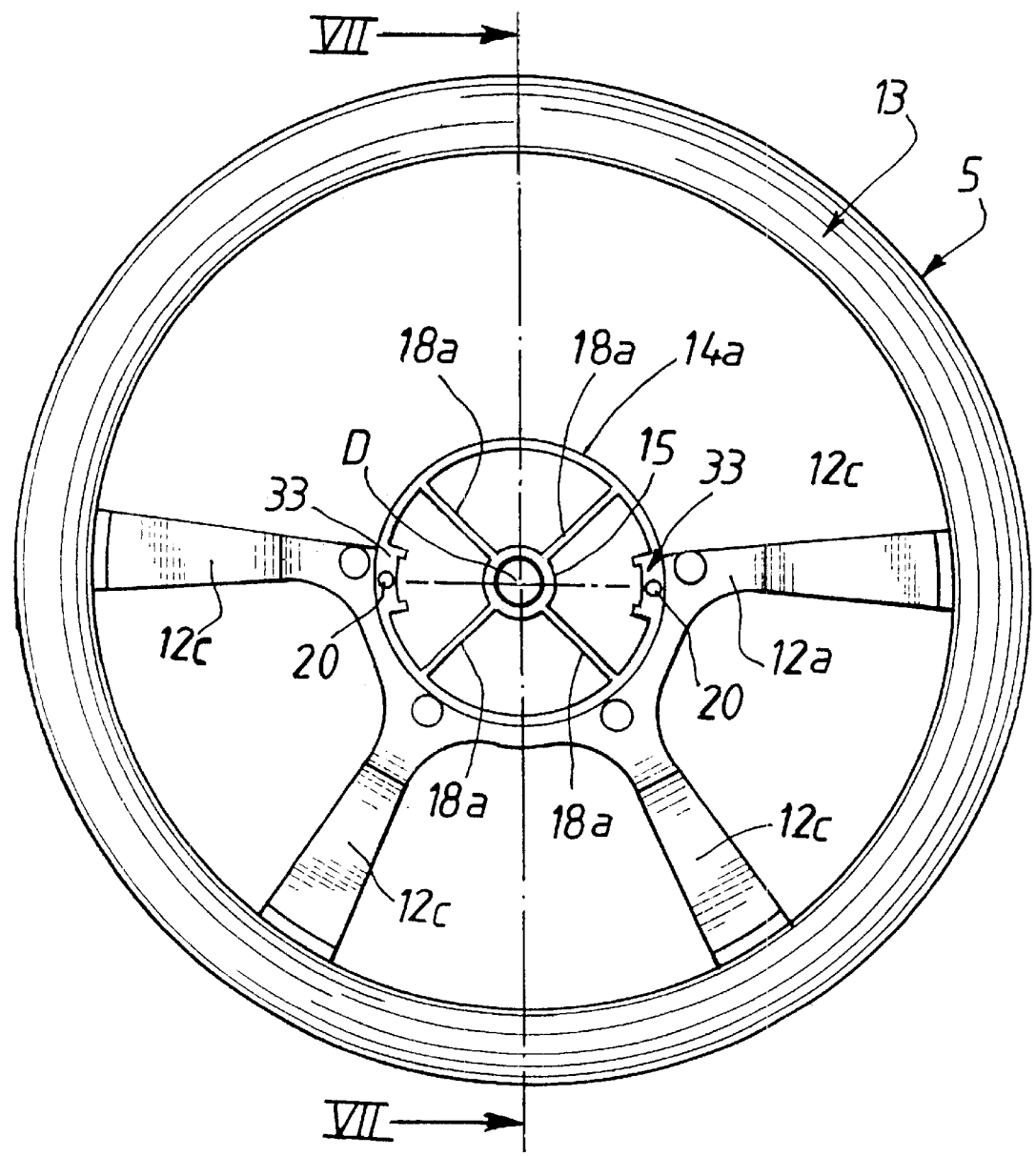
FIG. 7b is a frontal view of the steering wheel assembly of FIG. 5.
Figure 8A:
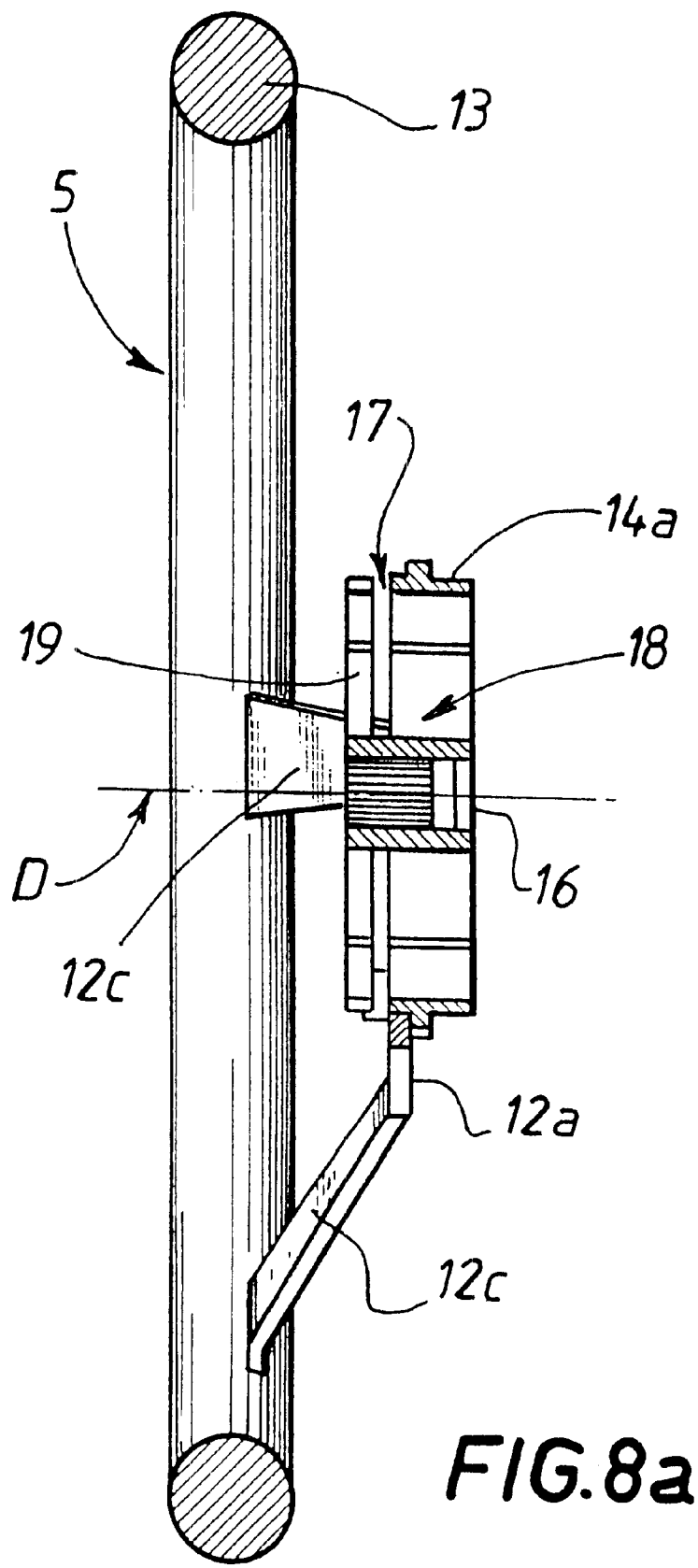
Figure 8B:
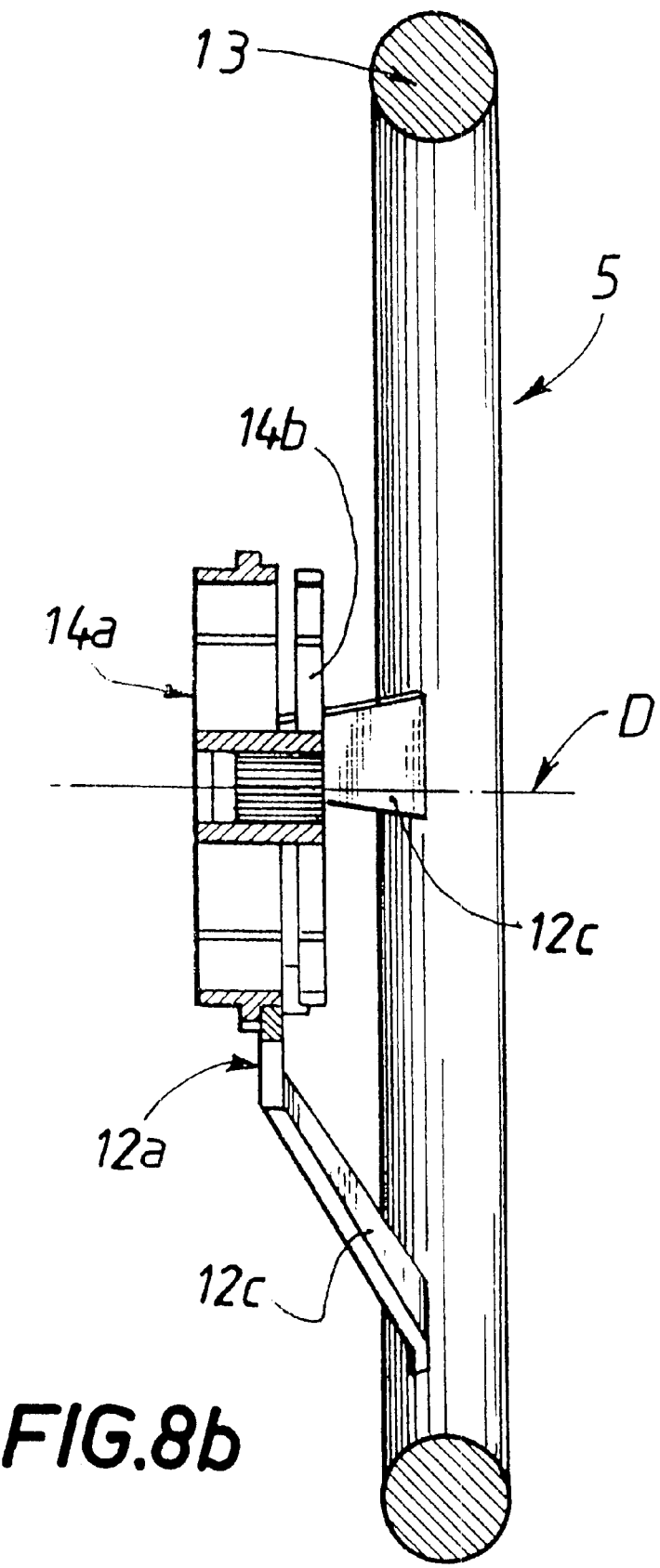
FIG. 8b is a sectional view along line VII—VII of FIG. 7b.
Figure 9:
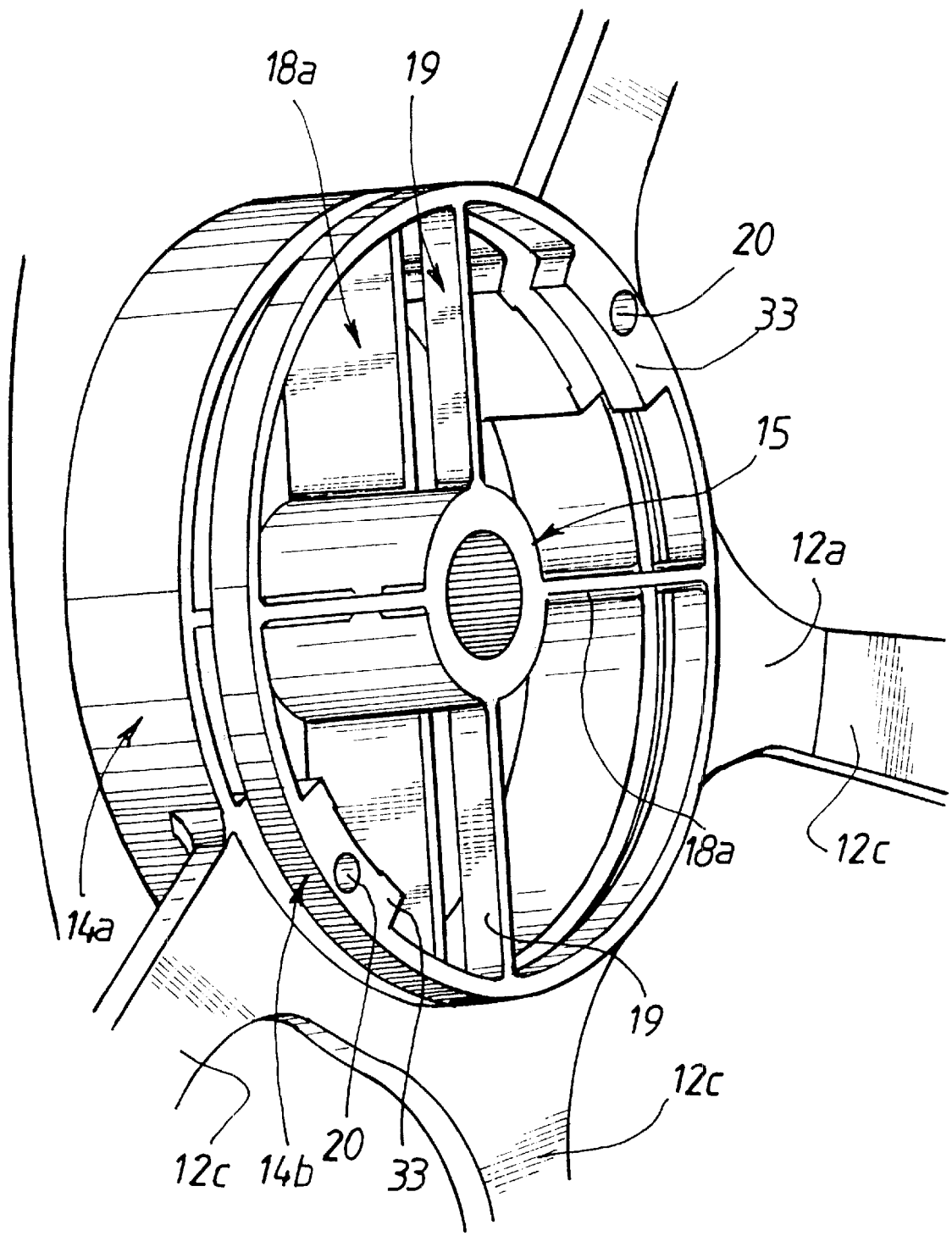
FIG. 9 is a detail view corresponding to FIG. 5.

The deformable external ring 14a of the hub 7 is rigidly connected to the arch 12a of the steering wheel 5, the screws 11 passing through the holes 12b of the arch to reach the holes 21 provided in the attachment hooks 25 of the external ring 14a. In a variant, as shown in FIG. 5, the hub with test body 7 can consist of a single piece together with the arch 12a of the steering wheel 5. For example, the hub with test body can be made so it forms a single piece with the steering wheel, or it can be welded to it by any appropriate means. A screw 10 attaches to the steering column 2 at the same time the steering wheel 5, the control assembly 3, the rotating connector 4, and the hub 7, extending over a length corresponding to the end part 2a of the transmission shaft of the steering column 2. An electronic circuit 8 is connected to the front side of the hub, for example, by gluing to the beams 19 or the sheeting connecting the external ring 14b to the internal ring 15.

When a driver applies force to the rim 13 of the steering wheel 5, the back external ring 14a that is integrally connected to the steering wheel 5 causes a flexional deformation of the beams 18a, the deformation being stronger the larger the resistant torque on the column 2. The front external ring 14b remains essentially unstressed. Its position can thus be used as a reference base for the measurement of the displacement of the back external ring 14a.

The front external ring 14b bears sensors 9 that can measure small displacements, on the order of a few microns to several hundreds of microns. In the illustrated embodiment, these sensors are two in number and are arranged in axial housings 20 provided in the front external ring 14b, perpendicularly with respect to the back ring 14a. These sensors 9 can be of any appropriate type: optical sensors, capacitive sensors, electromagnetic sensors, etc. In one embodiment, these sensors are probes with Hall effect. In another embodiment, these sensors are magnetoresistance probes (MR) or giant magnetoresistance probes (GMR). Although a single probe with Hall effect device 9 is sufficient for measuring small displacements, one can, for reasons of reliability, place several probes in the measurement gaps 17 to create a redundance. Each one of the probes with Hall effect can have its own associated electronic circuit. By comparison or combination of the signals delivered by two, three or four different probes, one can detect any defect of one of the probes and ensure an excellent reliability of the torquemeter.

Figure 10:
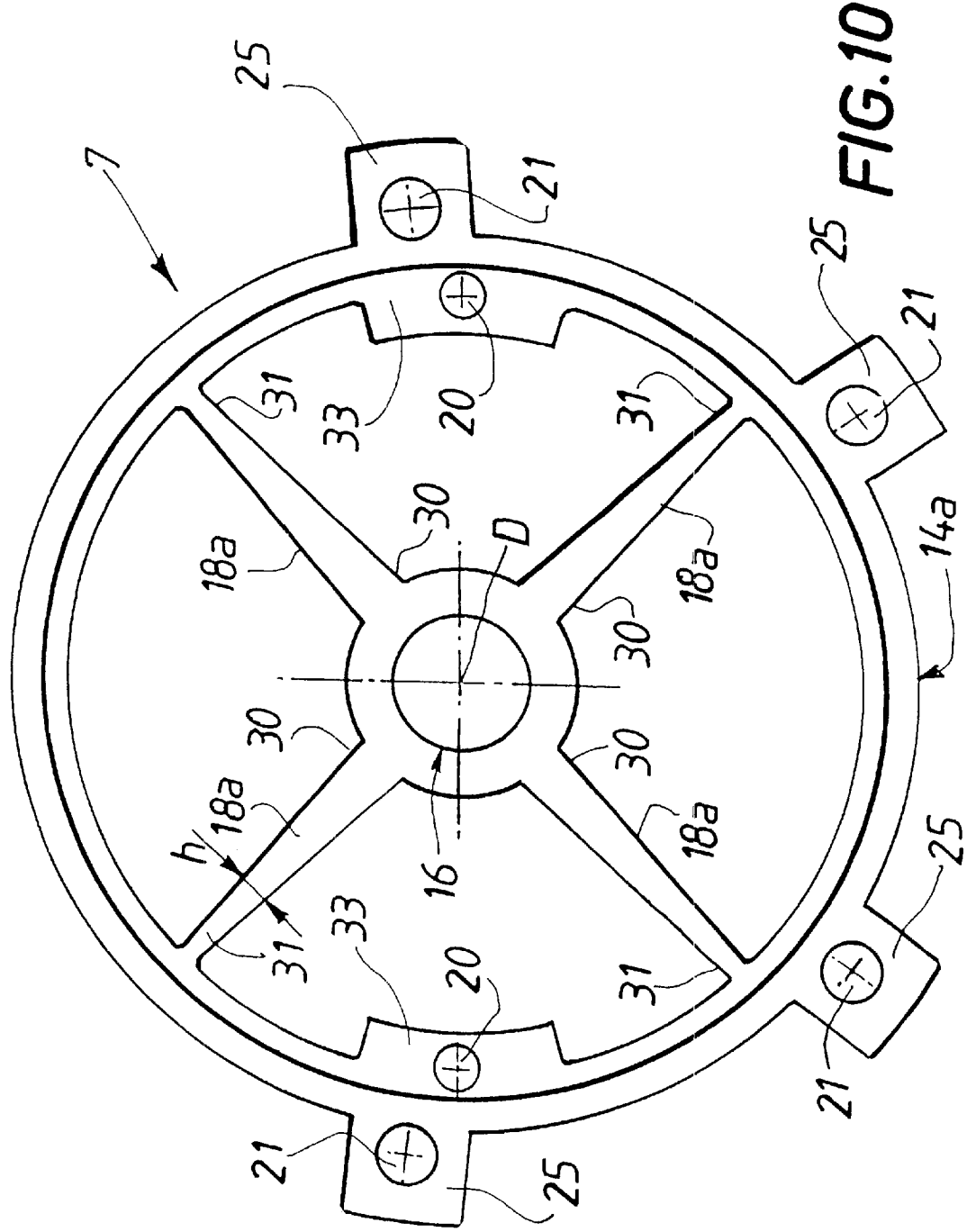
FIG. 10 is a frontal view of a steering wheel hub with test body illustrating another embodiment of the present invention.

A second embodiment of the hub 7 is illustrated in FIG. 10. This hub 7 comprises, similarly to the hub which has just been described, a deformable external ring 14a, an unstressed external ring 14b, an internal ring 15, deformable beams 18a connecting the ring 14a to the internal ring 15, and undeformed beams 19 connecting the ring 14b to the internal ring 15. The hub includes four beams 18a whose cross section varies from a base 30 adjacent to the internal ring 15 to a head 31 adjacent to the deformable external ring 14a. In other embodiments, the test body comprises one, two, three or more than four beams with variable cross section from their base to their head. This variation may be regular or not and can be connected to a variation in the width of the beam and/or a variation in the thickness of the beam.

The thickness h of the beam is measured tangentially with respect to a circle centered around the axis D. In the embodiment illustrated in FIG. 10, the thickness h varies essentially linearly. In other embodiments, not illustrated, the thickness h varies in a polynomial manner, logarithmically, either continuously or discontinuously, in a direction away from the axis D and toward the deformable external ring 14a. The width b of the beams 18a, measured along the direction D, is essentially constant in the embodiment illustrated in FIG. 10. In other embodiments, not illustrated, the width b varies in a linear manner or in a polynomial manner, the height h being also variable.

Figure 11:
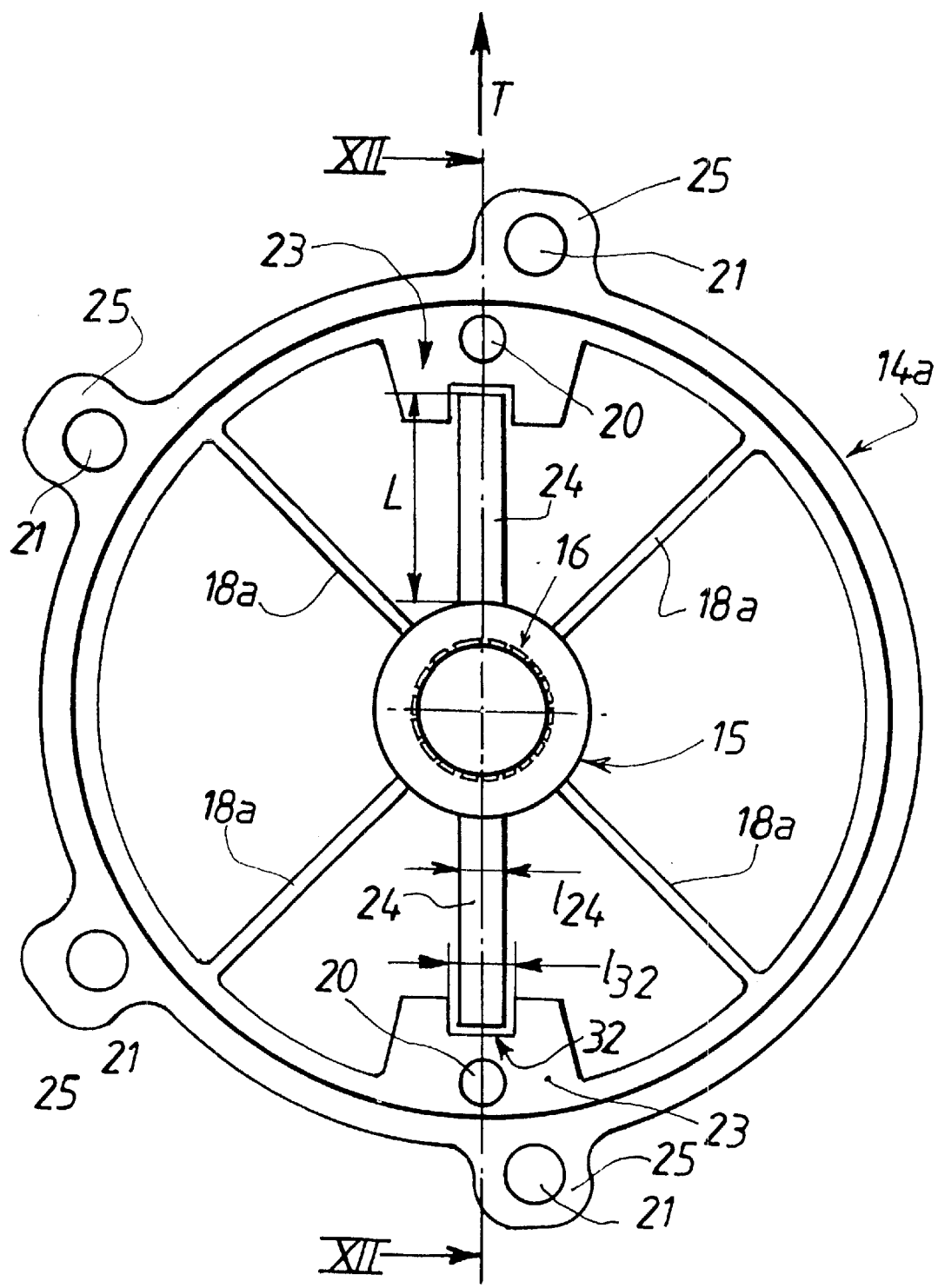
FIG. 11 is a frontal view of a steering wheel hub with test body, provided with abutment beams, according to another embodiment of the present invention.
Figure 12:
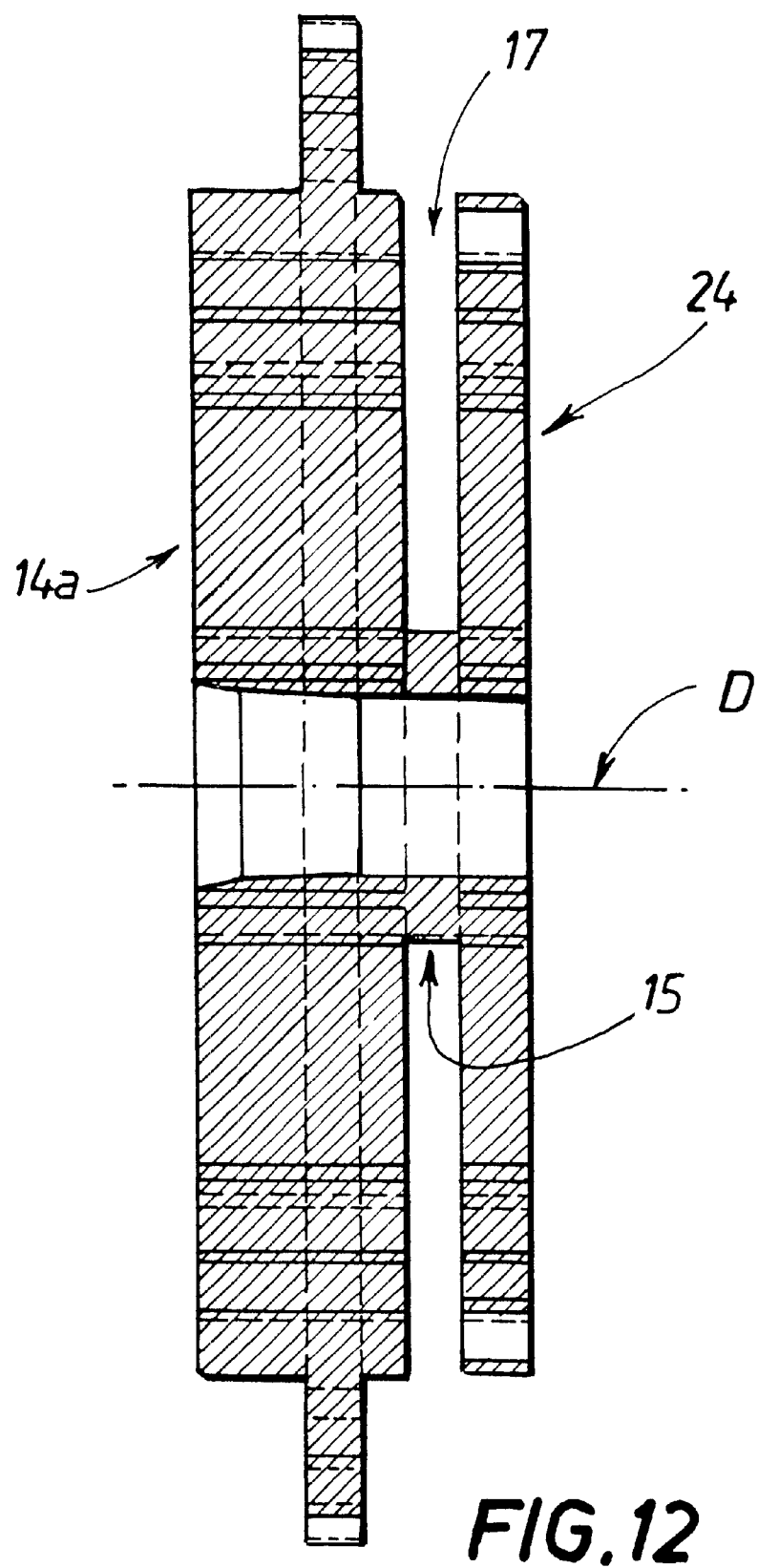
FIG. 12 is a sectional view along line XII—XII of FIG. 11.

FIG. 11 is a frontal view of a hub 7 with test body, equipped with abutment beams 24. In this embodiment, two abutment beams 24 extend radially along a transverse direction T from the internal ring 15 towards the deformable external ring 14a. The length L of the abutment beams 24 is less than that of the deformable beams 18a, the end part of each abutment beam 24 being engaged, with a predetermined clearance, in a deformation abutment 23. The deformation abutments 23 project internally with respect to the external ring 14a, and they comprise a groove 32 with width $l_{32}$ which is larger than the width $l_{24}$ of the beams 24. The clearance existing between the abutments and the beams 24, which has a relationship to the difference in width $l_{32}$–$l_{24}$, Can be determined as a function of the maximum permissible deformation for the deformable beams 18a. The purpose of this is, for example, to avoid plastic deformation of the deformable beams 18a.

Figure 13:
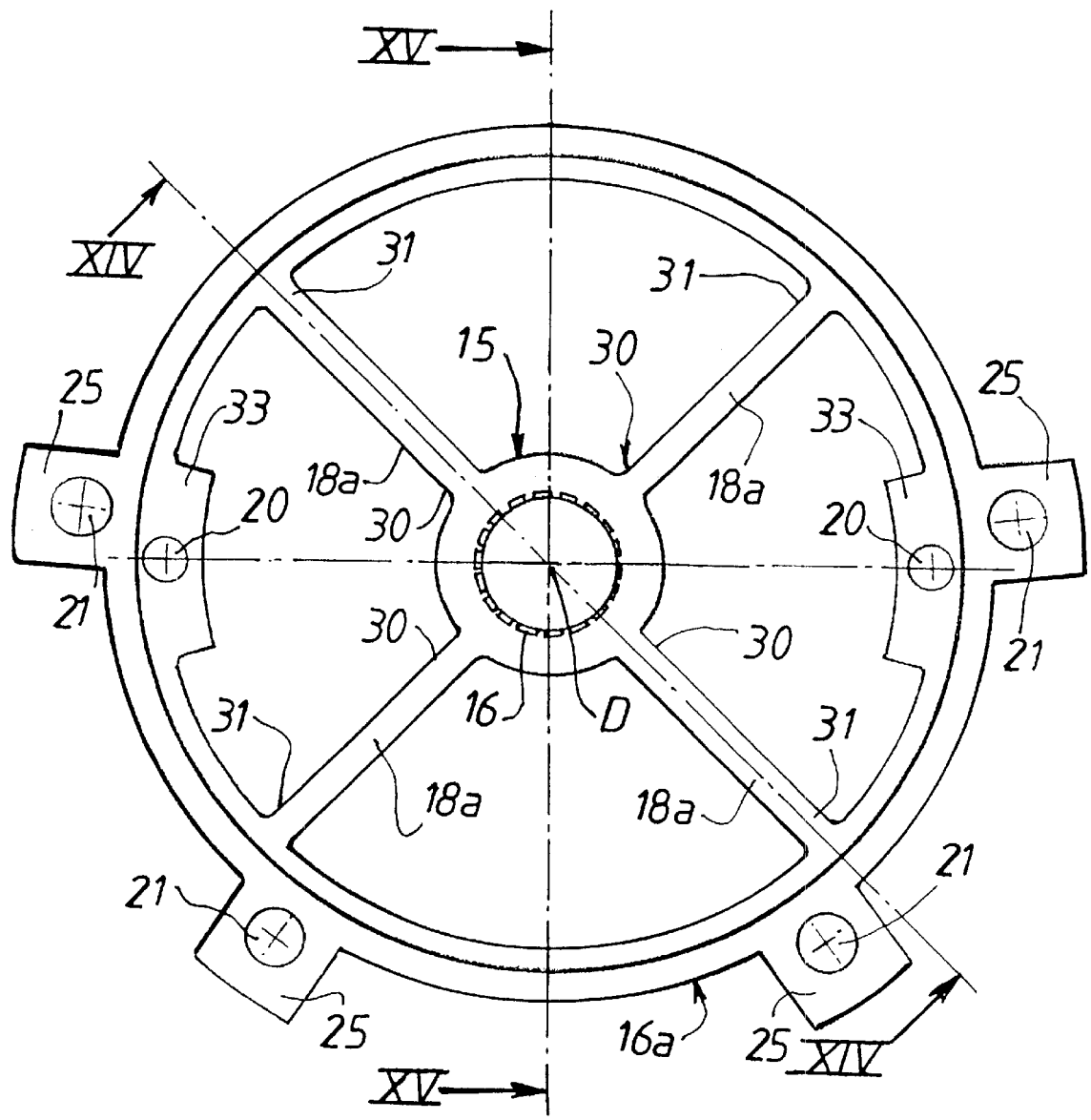
FIG. 13 is a frontal view of a steering wheel hub with test body illustrating another embodiment of the present invention.
Figures 14, 15:
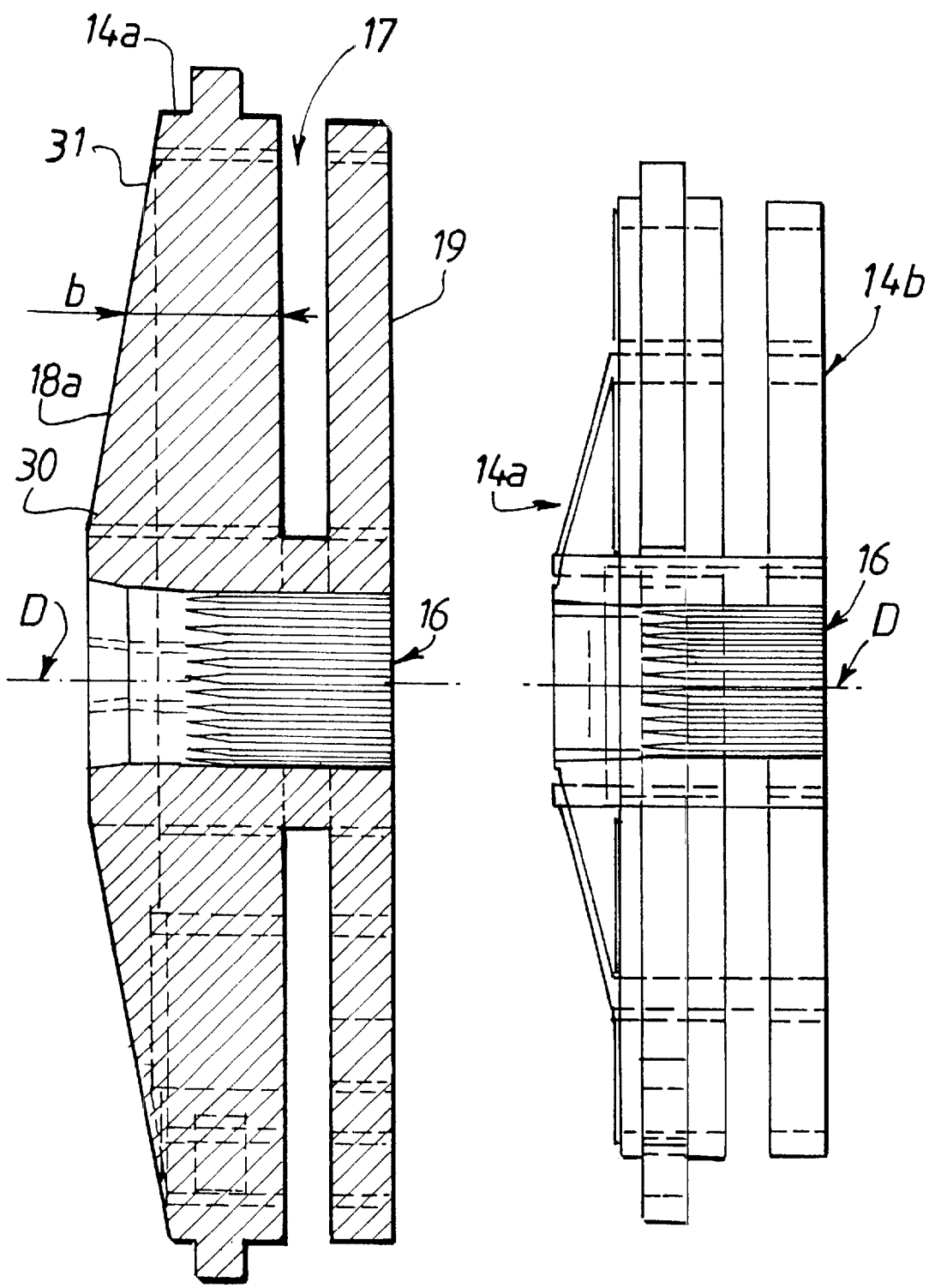
FIG. 14 is a sectional view along line XIV—XIV of FIG. 13.
FIG. 15 is a sectional view along line XV—XV of FIG. 13.
Figure 16:
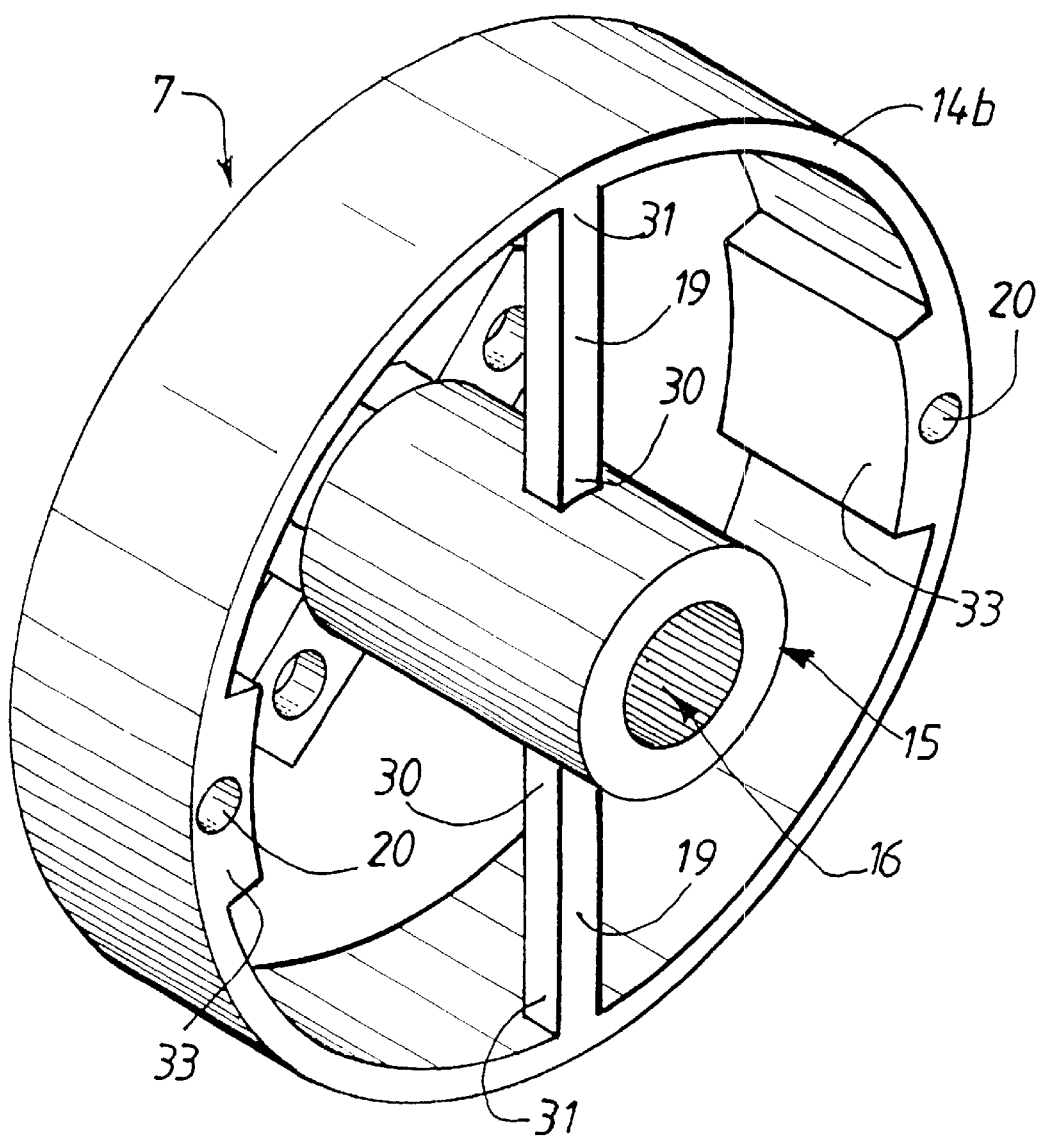
FIG. 16 is a perspective view of a hub with test body illustrating another embodiment of the present invention.
Figure 17:
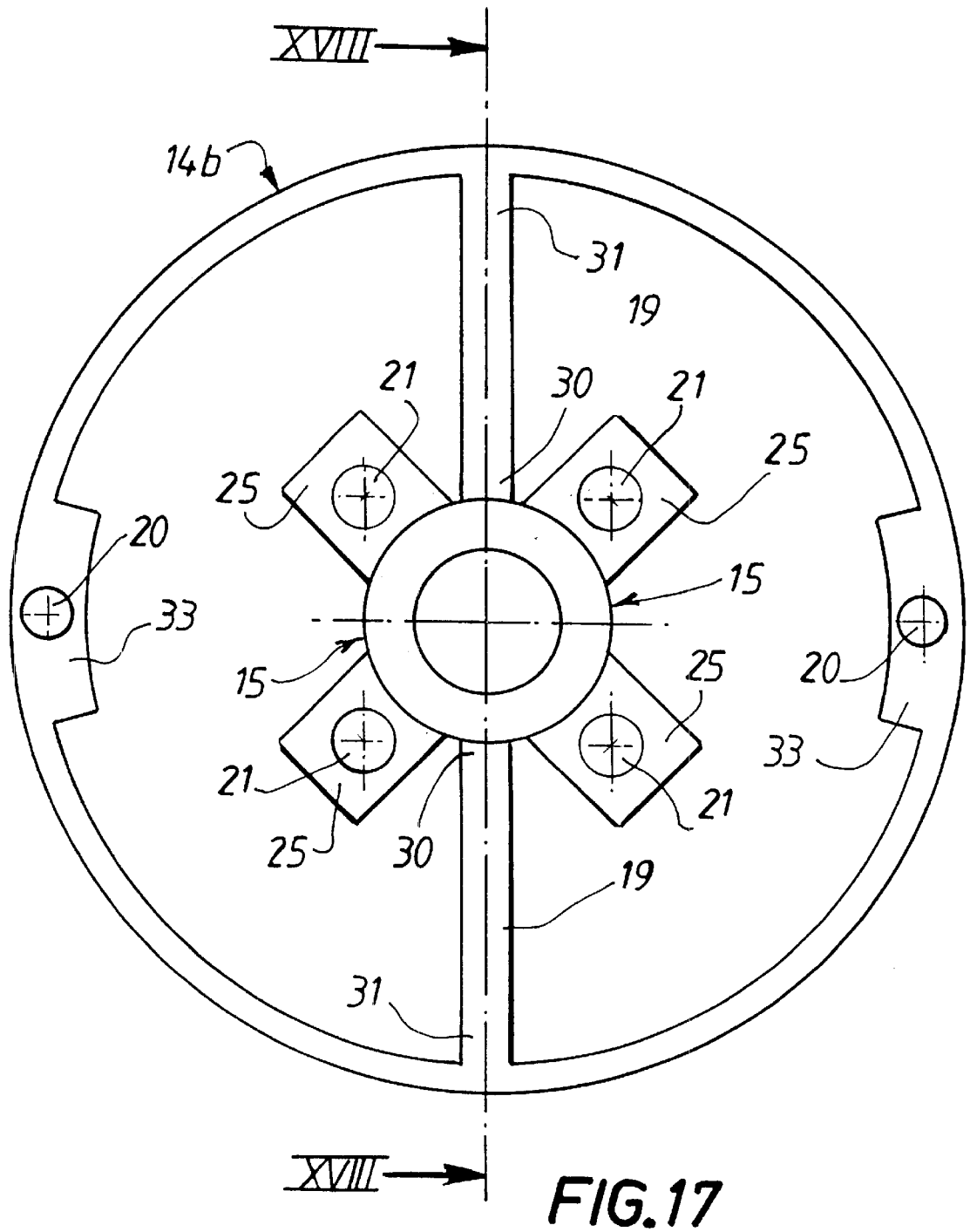
FIG. 17 is a frontal view of the hub with test body of FIG. 16.
Figure 18:
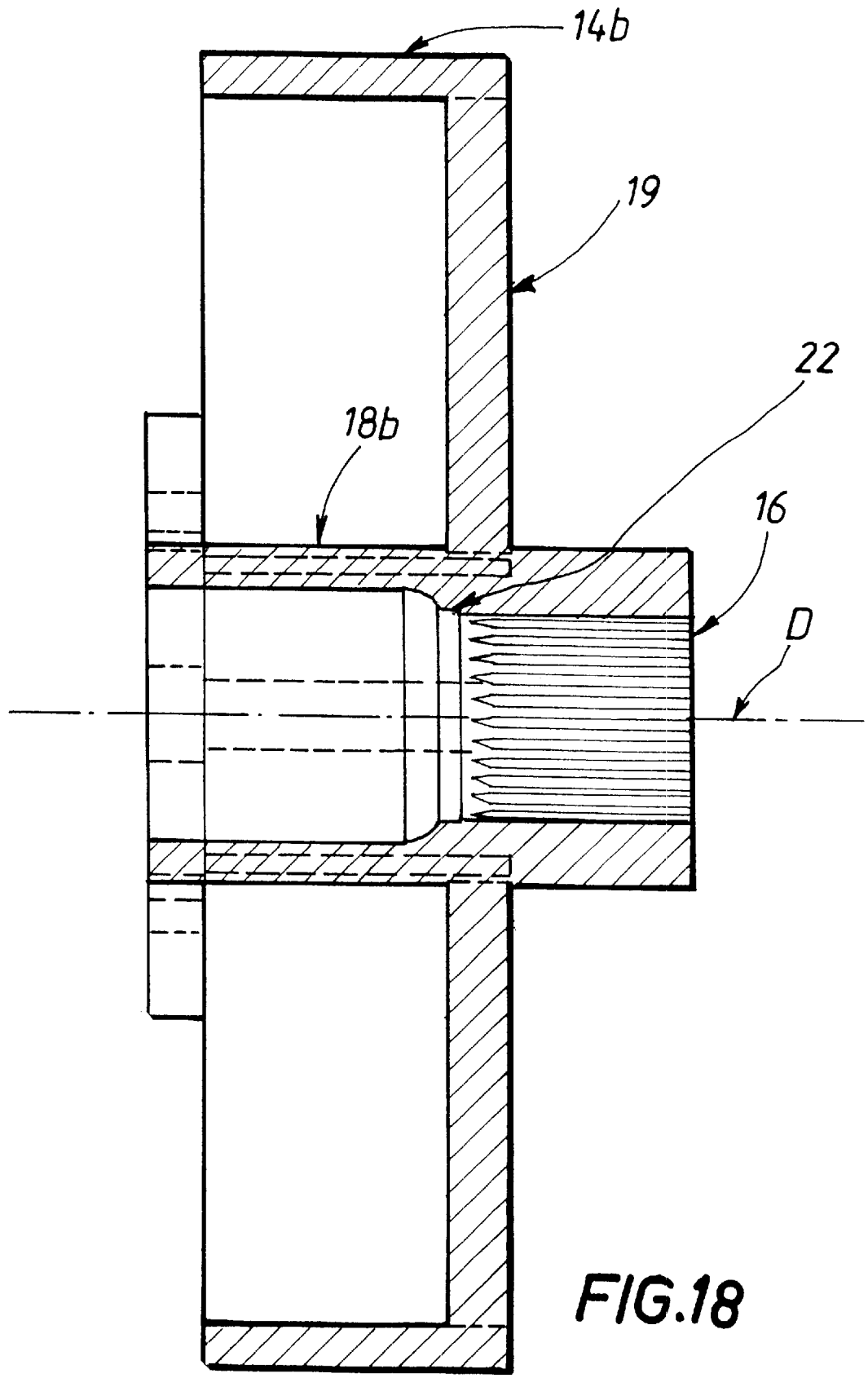
FIG. 18 is a sectional view along line XVIII—XVIII of FIG. 17.

FIGS. 13 through 15 illustrate another embodiment of the hub 7 with test body. In this embodiment, the width b of the deformable beams 18a varies from the feet 30 to the head 31 of these beams, in a decreasing manner. This decrease can be linear or polynomial. The number of deformable beams 18a, the angular distribution, the thickness and the height of the beams, and the material from which they are made, determine, as will be clearly apparent to a person skilled in the art, the following characteristics:

modulus of inertia;

maximum stress in the beams, for a given maximum torque, for example, at rupture;

value of the smallest measurable torque, for a given technique for the measurement of small displacements (for example, Hall probe).

The test body can be made of a material chosen from the group comprising: steels, cast irons, aluminum alloys, and magnesium alloys. A steel 35NCD16, a cast iron with spheroidal graphite, and an aluminum of the 7000 series can be considered, for example. The test body can be molded or machined as a function of the material used, the geometry of the beams, and the permissible cost, as can be determined by a person skilled in the art.

FIGS. 16 through 20 illustrate an embodiment of a hub with test body that comprises an unstressed external ring 14b, whose external peripheral surface is essentially cylindrical. This external ring 14b is provided with two housings 20, provided in two diametrically opposite thickened portions 33. Between these thickened portions 33, the internal surface of the external ring 14b is essentially cylindrical. The external ring 14b is joined to the internal ring 15 by means of at least one beam 19, a sheeting or any other connecting means that is essentially rigid. In the illustrated embodiment, two radial beams 19, that are made so as to form a single piece with the internal ring 15 and the unstressed external ring 14b, join these two rings 15, 14a. These beams 19 have, in the illustrated embodiment, a square cross section that is essentially constant from the foot 30 to the head 31, and they are essentially aligned. The internal ring 15 has a hole defining a splined end piece 16 for attachment and, on the opposite side, a bearing surface 22 for the transmission shaft of the steering column 2.

A tube 18b that is deformable in torsion connects the internal ring 15 to the deformable external ring 14a. In a variant, the deformable tube is perforated, with holes extending longitudinally to form separate beams that can be deformed in torsional flexion. Screws 11, through the holes 21, attach the hub 7 to a transverse central plate 40 of the reinforcement 12 of the steering wheel. The plate 40 is provided with holes 12b corresponding to the holes 21 of the hub 7. The reinforcement 12 of the steering wheel comprises, as in the embodiments of FIGS. 1, 5 and a, b several inclined arms 12c which connect the central transverse plate 40 to the rim 13 of the steering wheel 5. When the hub 7 is mounted on a steering wheel 5, in the manner shown in FIGS. 19 and 20, the deformable external ring 14a, that is integrally connected to the plate 40 and thus to the rim 13 of the steering wheel 5, is displaced in rotation with respect to the unstressed external ring 14b. The measurement of this small displacement, for example, by means of Hall effect probes 9 placed in the housings 20 and magnets 9' attached opposite the plate 40, makes it possible to measure the torque applied by the driver and allows the control of the power assistance, after processing of the signal by the electronic circuit 8.

Figure 19:
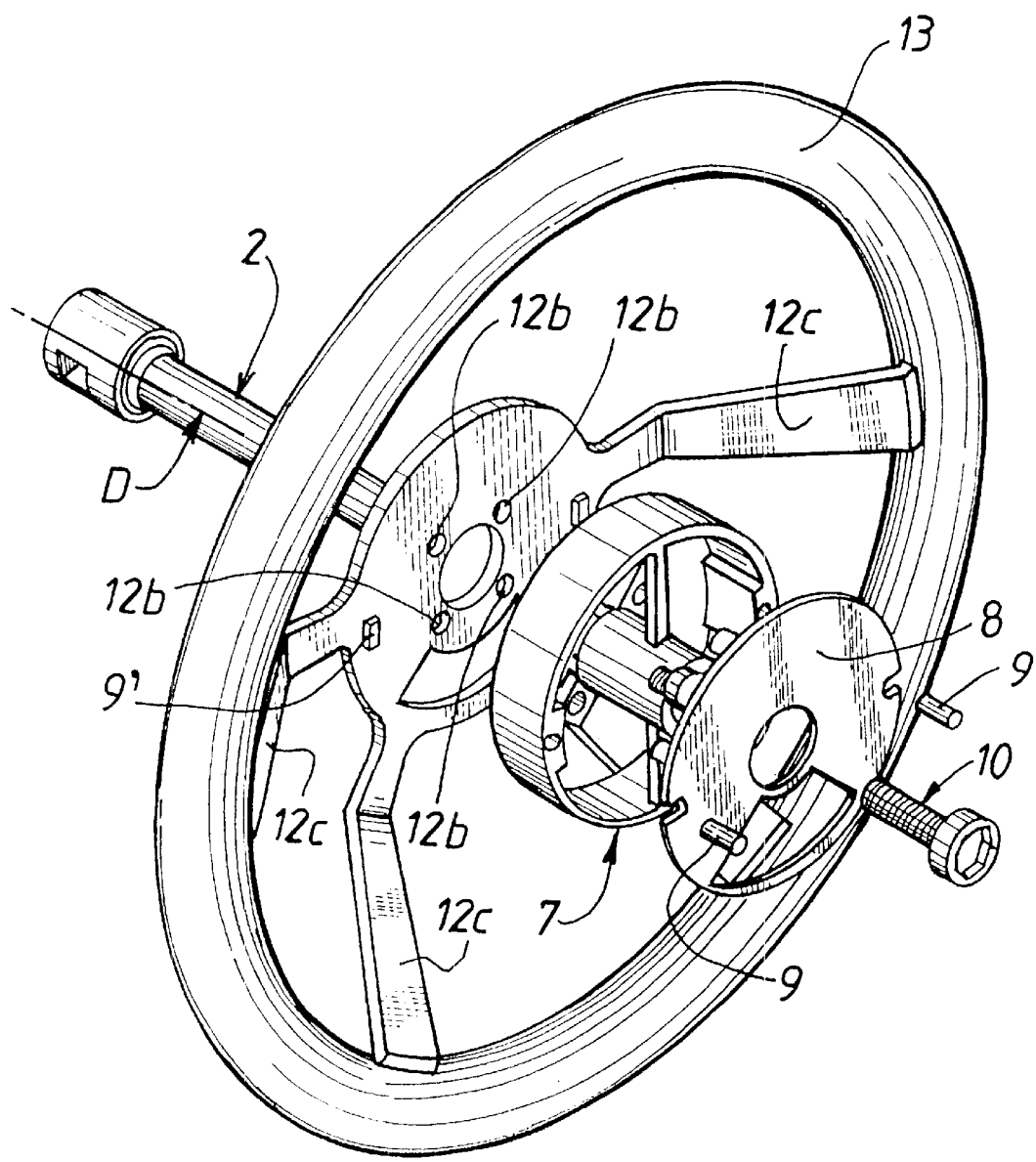
FIG. 19 is an exploded perspective view of a steering device comprising the hub with test body illustrated in FIGS. 16, 17 and 18.
Figure 20:
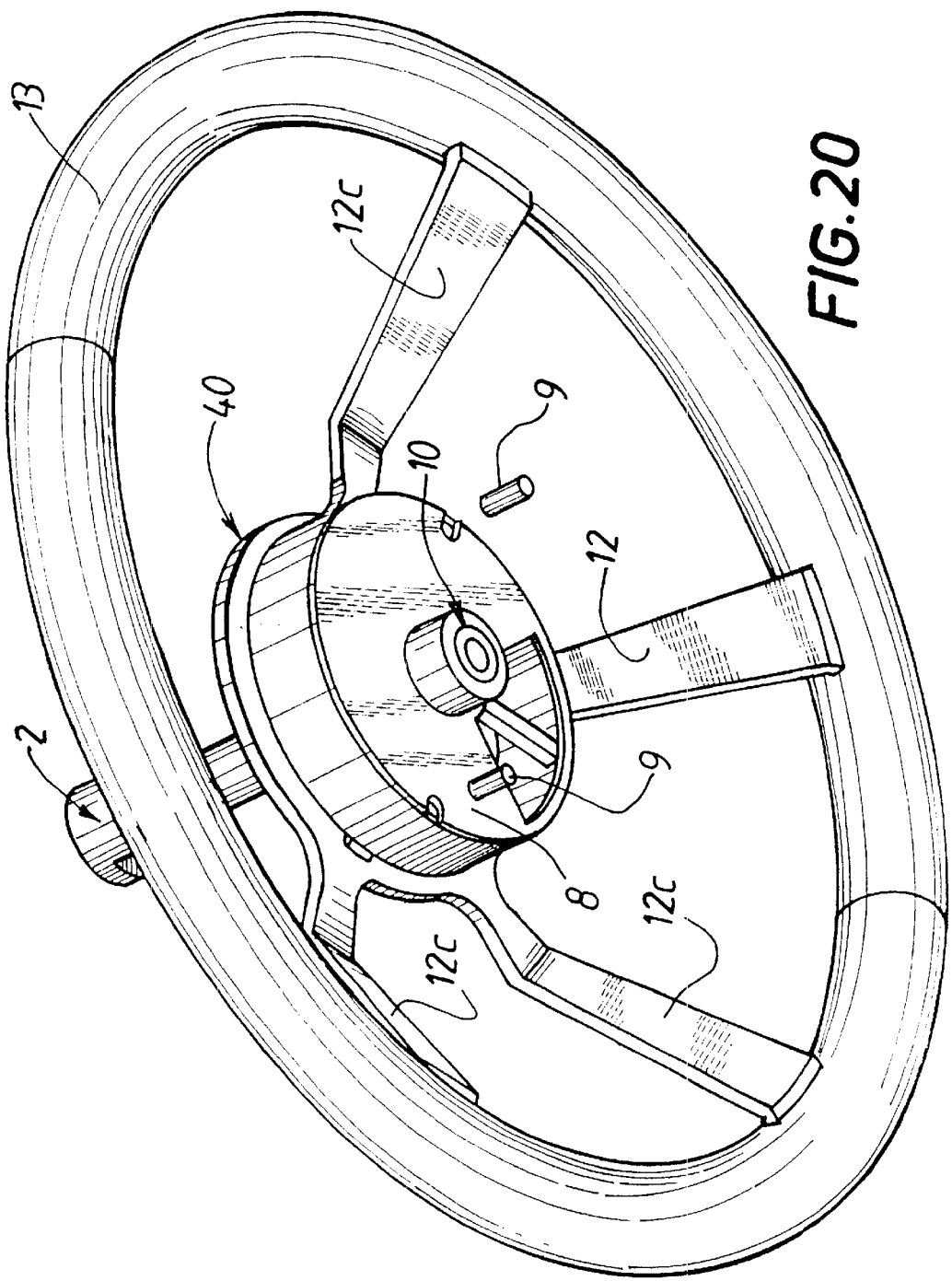
FIG. 20 is a perspective view of the steering device of FIG. 19, as assembled, the sensors being pulled out of their housing.
Figure 21:
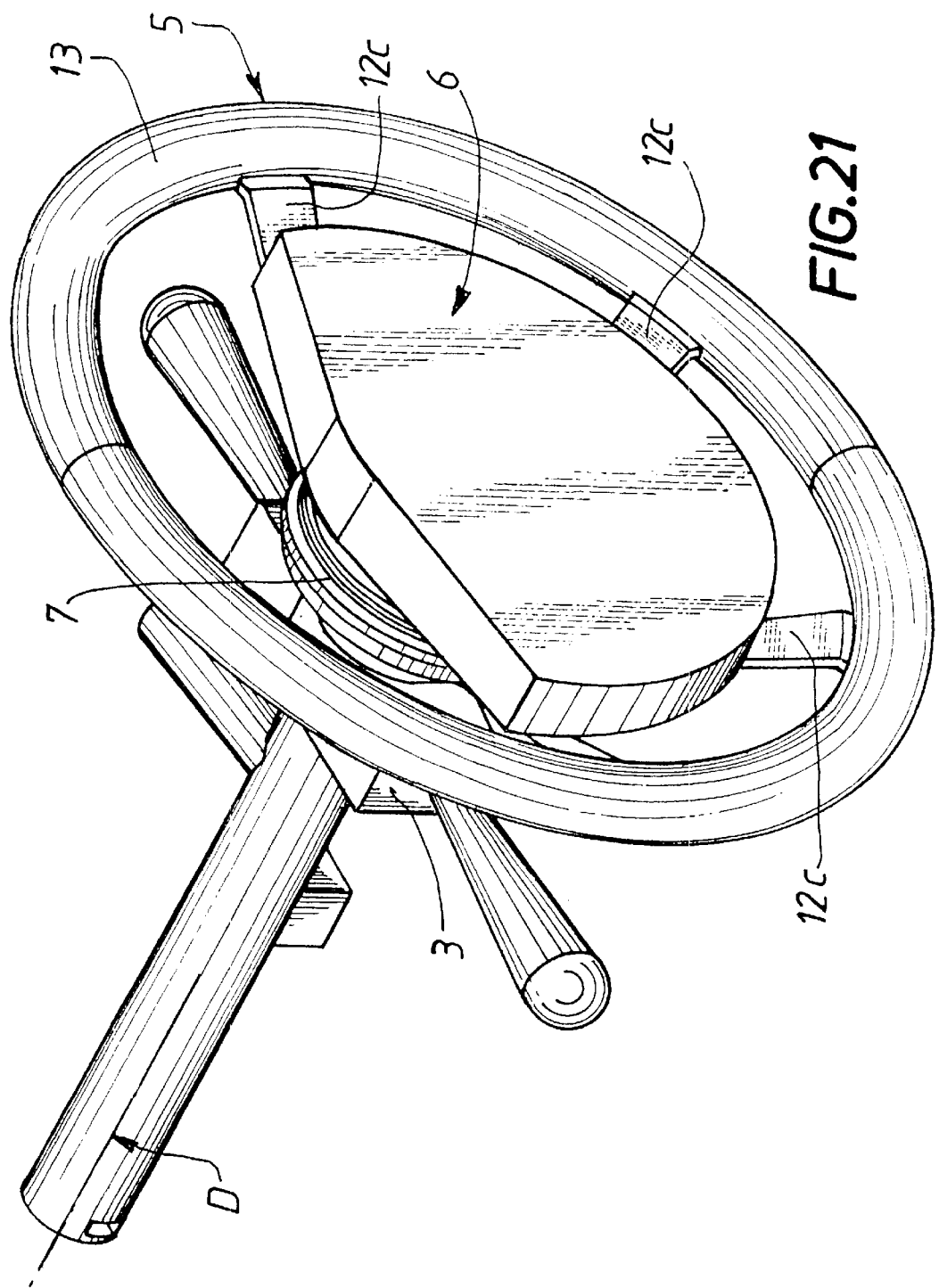
FIG. 21 is a perspective view of a steering device, corresponding to FIGS. 1, 5 and 19, with an inflatable safety bag housing mounted in the central part of the steering wheel.
Figure 27:
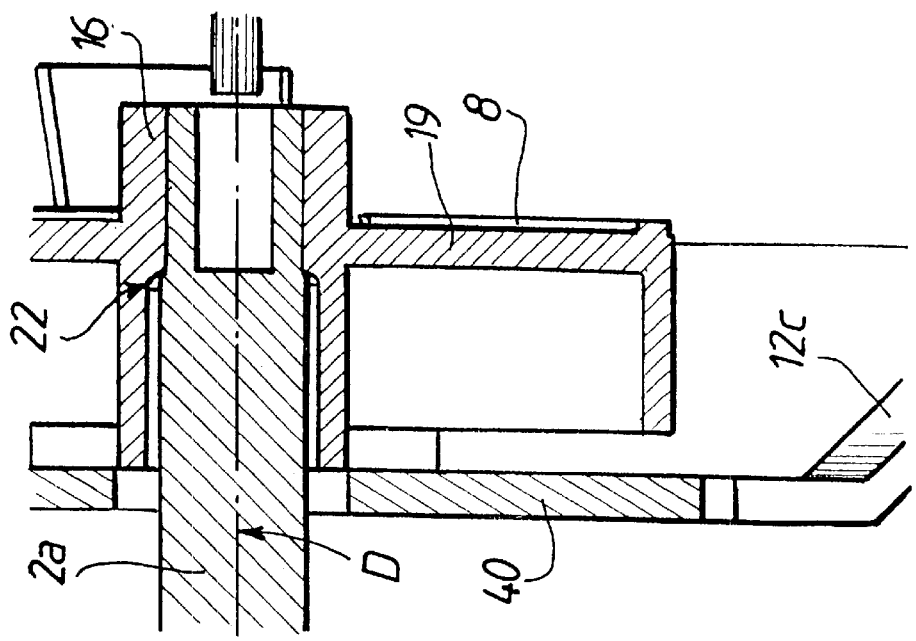
FIGS. 26 and 27 are transverse sectional views of the steering device illustrated in FIGS. 16 through 20, where
Figure 22:
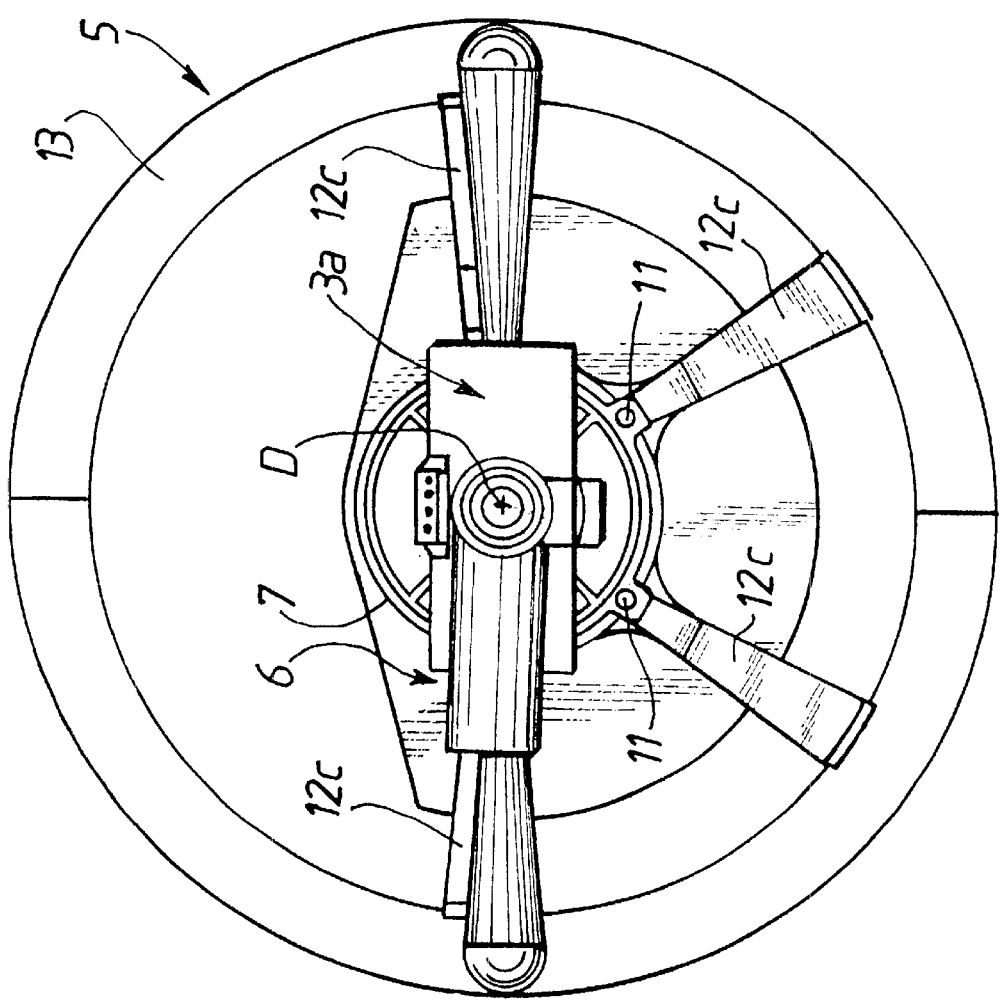
FIG. 22 is a view from the back, in the direction of arrow A, of the steering device illustrated in FIG. 1, after assembly.
Figure 23:
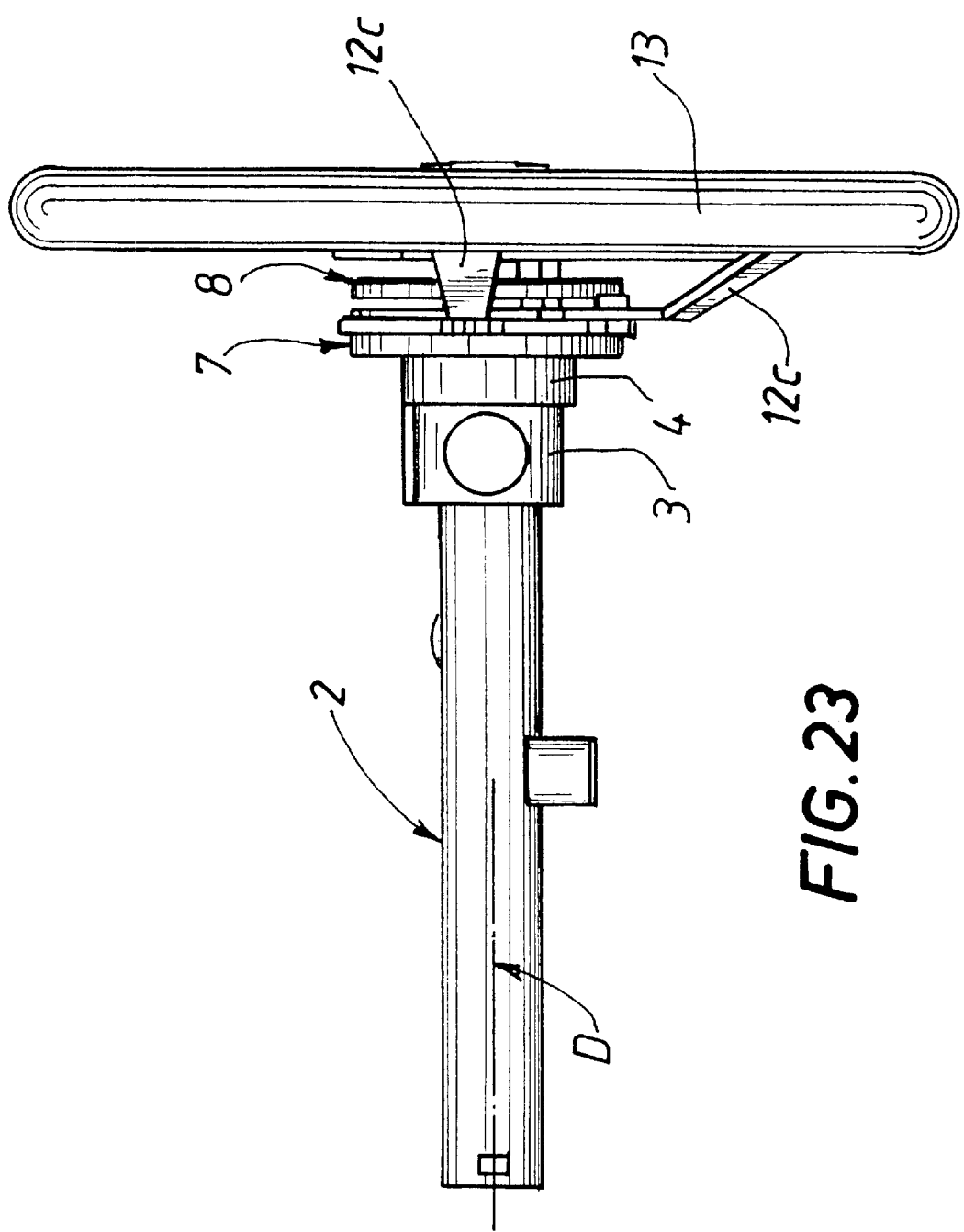
FIGS. 23 and 24 are lateral views, taken at a 90 degree angle with respect to each other, of the steering device illustrated in FIG. 22, where
Figure 24:
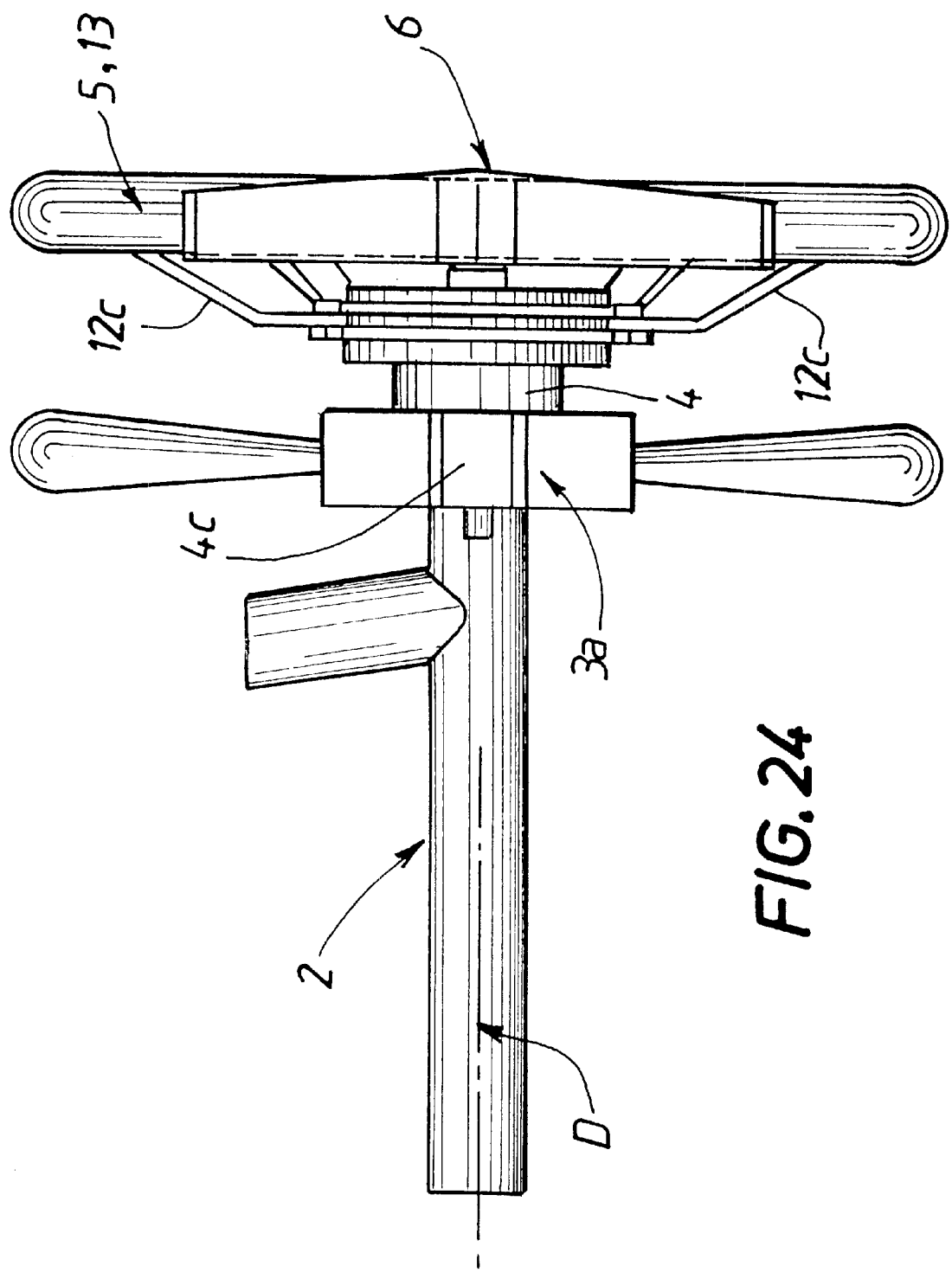
Figure 25:
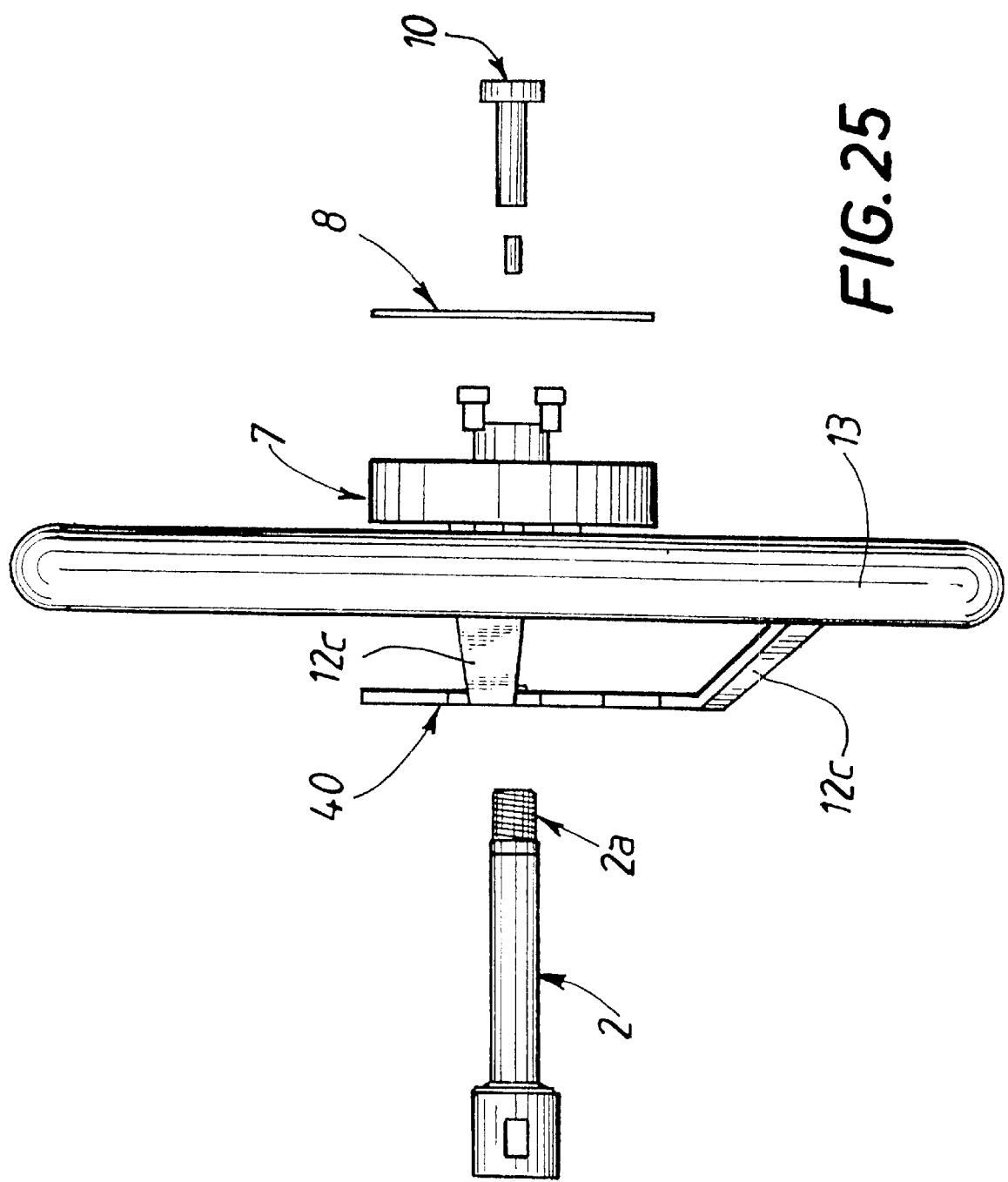
FIG. 25 is a lateral exploded view showing the method of assembly of a steering device comprising a hub with test body.
Figure 26:
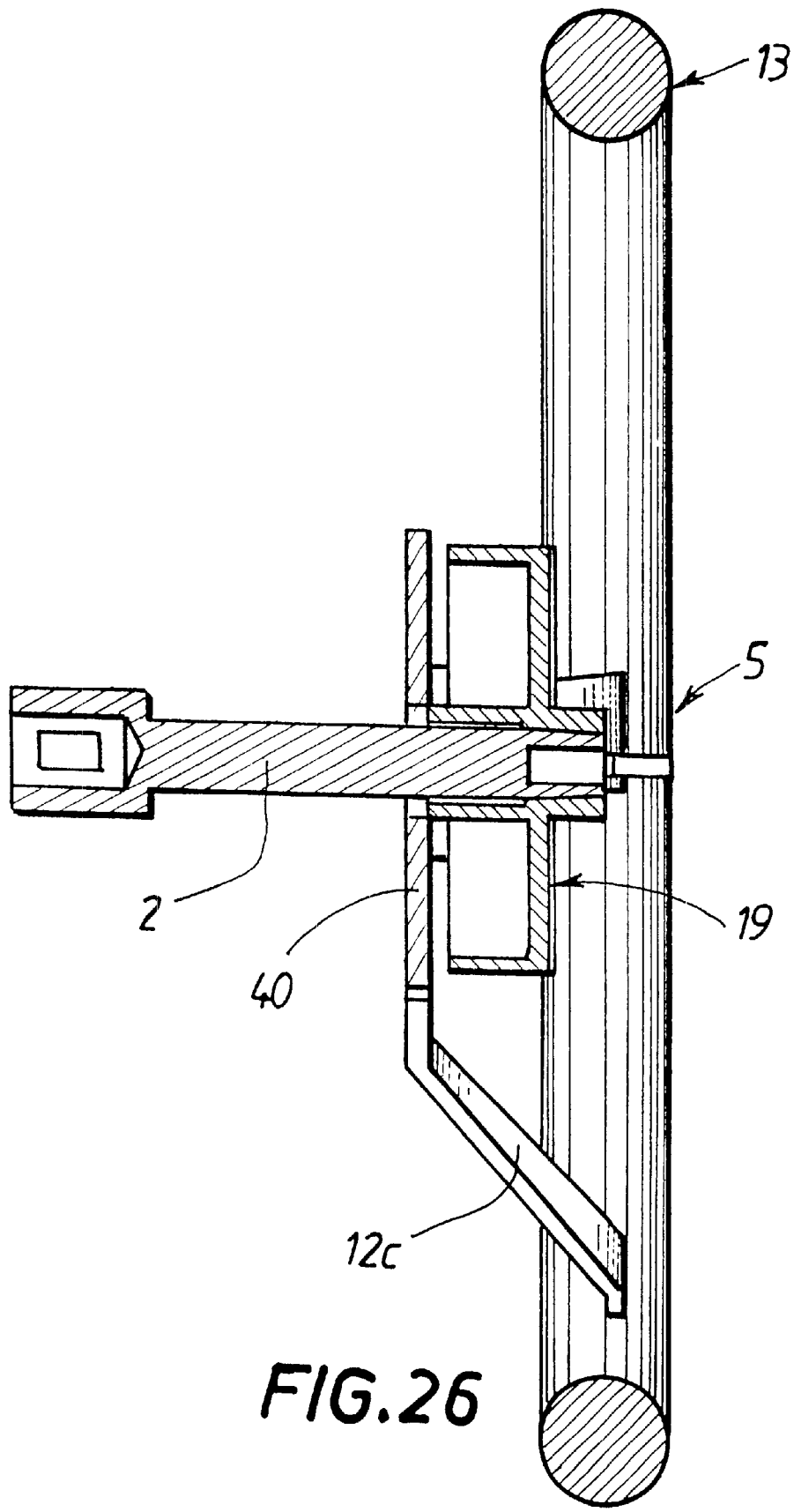

FIG. 21 is a perspective view of a steering device, corresponding to FIGS. 1, 5 and 19, with an inflatable safety bag housing mounted in the central part of the steering wheel. FIG. 22 is a view from the back, in the direction of arrow A, of the steering device illustrated in FIG. 1, after assembly. FIGS. 23 and 24 are lateral views, taken at a 90 degree angle with respect to each other, of the steering device illustrated in FIG. 22, where FIG. 23 is a left side view and FIG. 24 is a top view. FIG. 25 is a lateral exploded view showing the method of assembly of a steering device comprising a hub with test body. FIGS. 26 and 27 are transverse sectional views of the steering device illustrated in FIGS. 16 through 20, where FIG. 27 is a detail of FIG. 26.

Figure 28:
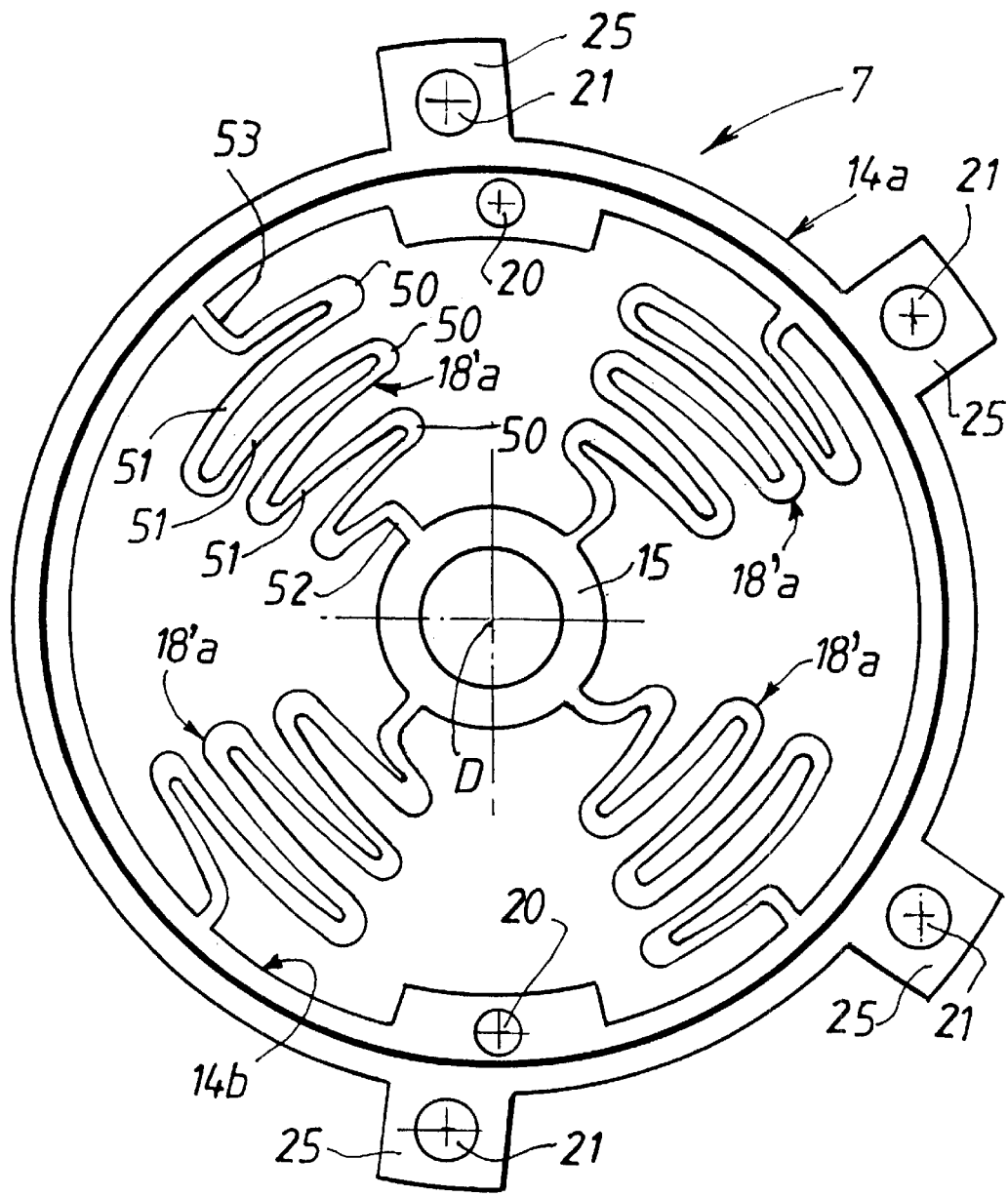
FIG. 28 is a frontal view of a hub with test body illustrating another embodiment of the present invention.

FIG. 28 illustrates another embodiment of the hub 7, which can be used instead of the above-described hubs. In this embodiment, elastically deformable means 18'a, which connect the internal ring 15 to the deformable external ring 14a, are in the form of serpentine coils. These coils form several bent parts 50 that are separated by sectors that are essentially in the shape of concentric circle arcs 51. These coils extend essentially in the same plane perpendicular to the axis D of the transmission shaft. The thickness of each coil, in the embodiment illustrated, is essentially constant from the base 52, adjacent to internal ring 15, to the head 53, adjacent to external ring 14a, of the coils. In other variants, not illustrated, the coils are two, three or more than four in number. The thickness of at least one coil can be variable, optionally, from its head to its base.

Figure 4:
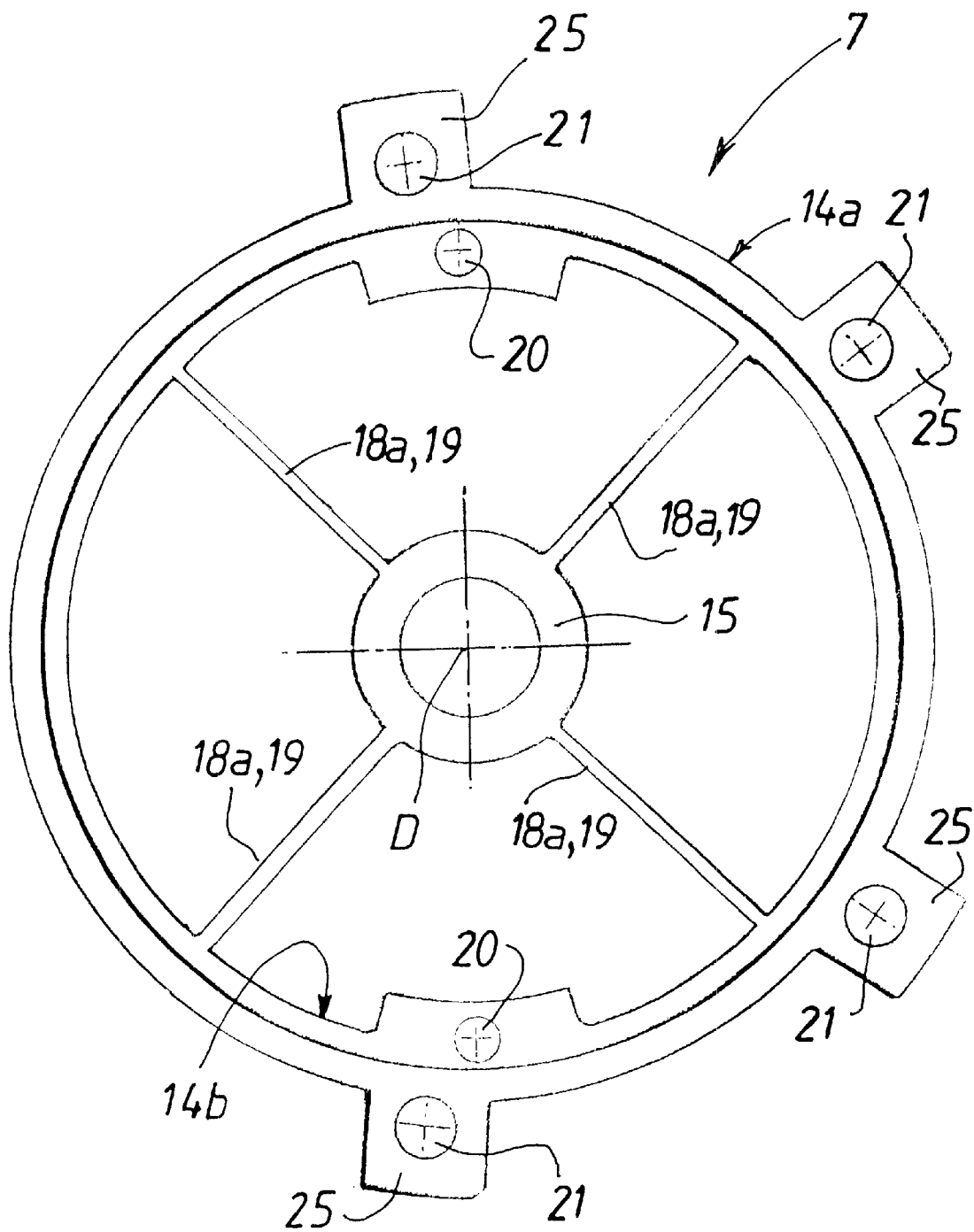
FIG. 4 is a frontal view of the hub with test body of FIG. 3.
Figure 29:
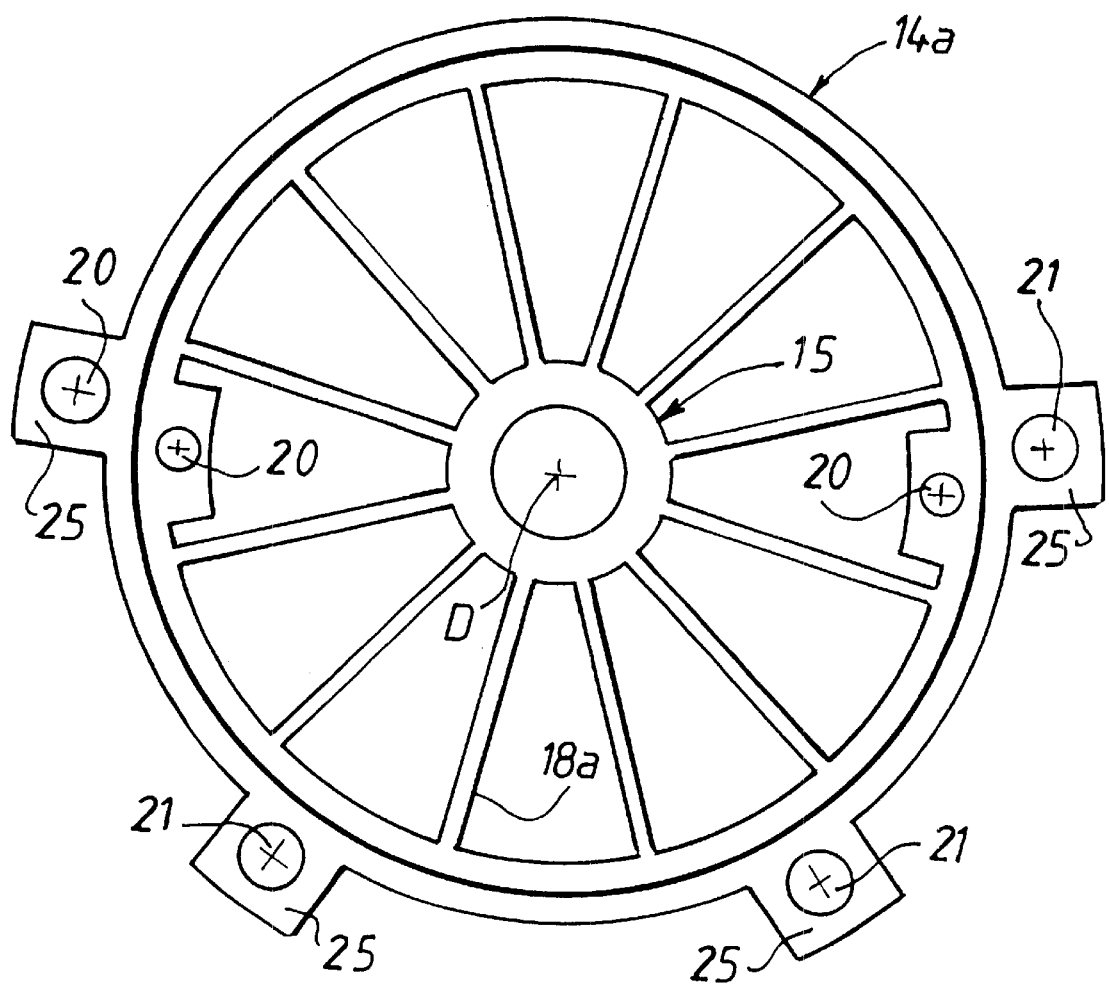
FIGS. 29 and 30 are frontal views of hubs with test body illustrating other embodiments of the present invention.
Figure 30:
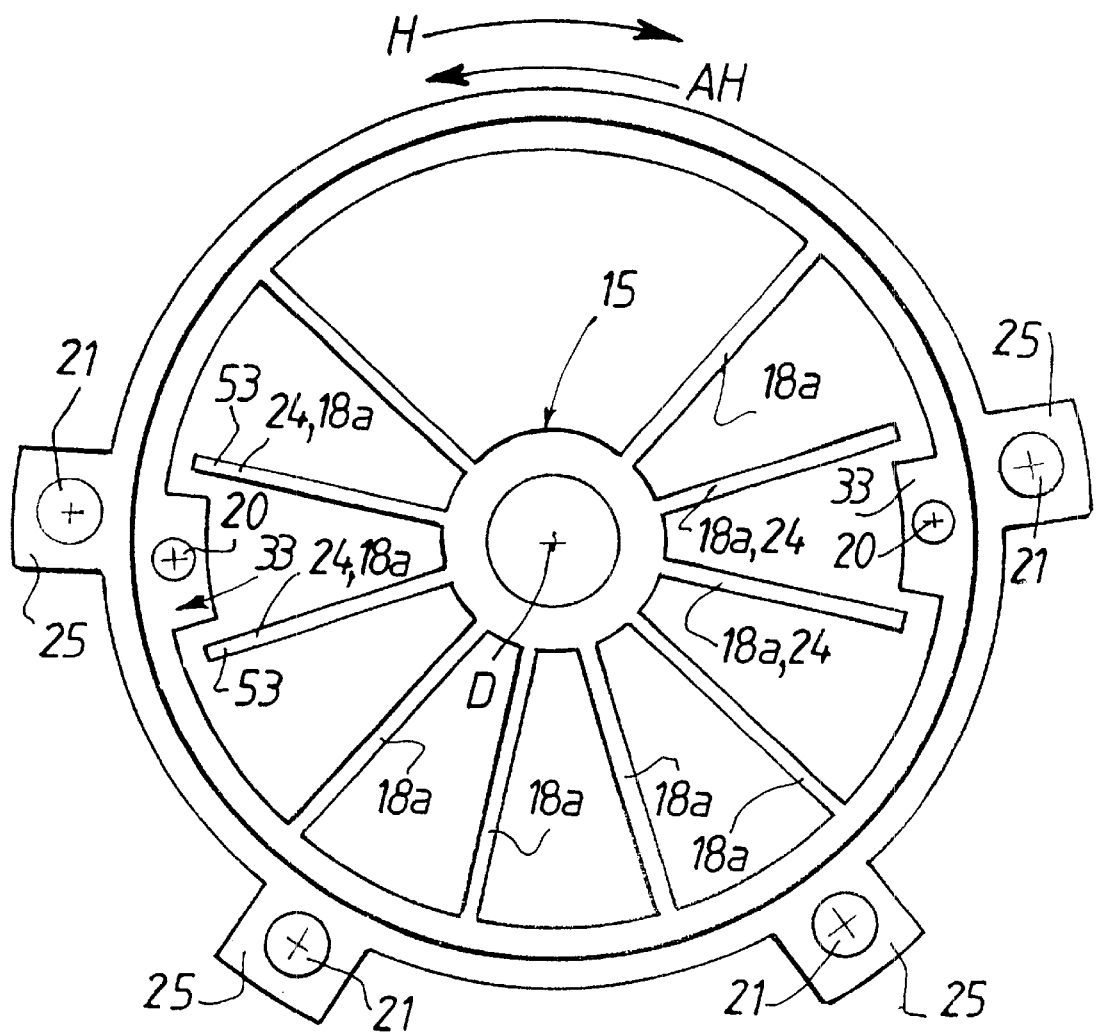

FIGS. 29 and 30 are frontal views of a hub with test body comprising more than four deformable beams 18a of the type illustrated in FIG. 4, in this instance twelve beams radially distributed regularly around the axis D. Starting with the test body represented in FIG. 29, it is possible, by machining or by any other means, to obtain the test body represented in FIG. 30, that now comprises only ten deformable beams 18a, of which four serve as abutments at the time of the application of a torque exceeding a threshold value. The abutment is obtained, regardless of the direction of rotation imposed by the transmission shaft, as soon as a torque threshold value is reached, by contact between the end part 53 of the abutment beams 24 and the thickened portions 33 projecting internally in the undeformed external ring 14b.

Depending on the radial angular arrangement of the abutment beams 24, the maximum torque permissible in the clockwise direction H can be greater than, equal to, or less than the maximum torque permissible in the counterclockwise direction AH. The beams which can be deformed in flexion, described above, comprise cutouts in some variants. At the time of the application of a torque, only the beams 18a that have not been cut into two sections transmit the forces, whereas the sections of beams that have been cut transmit flexion force only if an applied torque threshold is exceeded. The two sections of a cut beam are, in one embodiment variant, separated from each other by a predetermined distance which is a function of said threshold value for the torque. The cut applied to a beam is, in a variant, arranged essentially at 45 degrees with respect to the radial direction of the beam in question. The application of the cut to at least one deformable beam 18a can allow, depending on the number and the arrangement of the set of beams, notably protection against excess loads, in the two possible directions of rotation, or a torquemeter with several ranges of torque measurement, the rigidity of the torquemeter increasing as soon as a large number of beams is placed under load.

Figure 31:
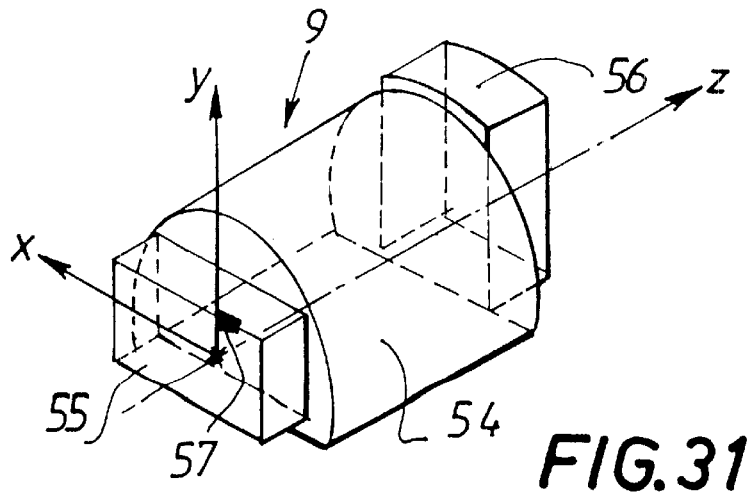
FIG. 31 is a perspective view of a sensor with Hall effect intended to be integrated in a hub as illustrated in FIGS. 1 through 30, according to an embodiment of the present invention.

FIG. 31 is a perspective view of a sensor 9, according to one embodiment, comprising a cylindrical body 54 made of ferro-magnetic material and a magnetic detector 55, intended to be opposite a magnetic field generator, such as a magnet 9'. The sensor 9 comprises, opposite the magnetic detector 55, a part that forms an abutment 56 and that limits the axial movement of the sensor 9 in the housings 20. The magnetic detector 55 comprises a sensing element 57 that is eccentric with respect to the circular section of the sensor 9, so that the rotation of the sensor 9 about the axis $O_z$ generates a displacement along the axis $O_x$ of the sensing element 57. During factory installation of the sensors 9, an operator finishes the assembly by measuring the signal delivered by the sensors 9 using an appropriate apparatus. This signal is a function of the position of the sensing element 57 with respect to the magnetic transition, so that the operator can, by rotating the sensor 9, move the sensing element 57 opposite the magnetic transition of the magnetic field generator and cancel the signal. Once this adjustment is performed, the sensors are immobilized, for example, by means of glue. The adjustment described is called regulation by eccentric regulation.

The power of the signal supplied by each magnetic detector 55 can also be modulated by modifying the axial penetration of the sensors 9 in the housings 20 so as to modify the gap between the detector 55 and the magnet 9' opposite the latter. In the embodiment variant of the sensor 9 represented in FIG. 31, the minimum value of the gap is fixed for the part forming an abutment 56, which is applied against the front face of the thickened portions 33 of the undeformable ring 14b. The calibration of the torquemeter can be obtained, for example, by the application of a calibrated load and by the regulation of the level of amplification of the signal.

The electronic circuit 8 comprises, in one embodiment:
a current inlet to supply power to the Hall probes;
a circuit for filtering the signal originating from the probes, to eliminate the background noise;
a module which ensures the analog-digital conversion of the signal;
a module for the control and for the compensation for drift of the signal issued by the probes as a function of the temperature, for example, in a range from −40 to +80 degrees C.; and
a safety module which regularly tests the proper operation of each one of the probes.

Optionally, the electronic circuit 8 comprises a module which allows the determination of the threshold for triggering the steering assistance, which trigger corresponds to a predetermined value, or a module for the wireless or contactless transmission of the signal.

Having described the invention, what is claimed is:

1. A torque sensor comprising:
a first external ring at least one essentially unstressed connection means for connecting a second external ring; having at least one elastically deformable connection means for connecting the first external ring to an internal ring that is adapted for connection to a rotatable column so the internal ring rotates with the column;
a second external ring placed at a distance from the first external ring, the second external ring to the internal ring;
a torque applying means configured for connection to the first external ring; and
measurement means for measuring a displacement of the first external ring with respect to the second external ring when a torque is applied to the first external ring by the torque applying means, the measurement means being mounted on the second external ring for rotation with the column.

2. A torque sensor according to claim 1, wherein the elastically deformable connection means connecting the first external ring and the internal ring comprises a beam extending radially from the internal ring toward the first external ring.

3. A torque sensor according to claim 1, wherein the elastically deformable connection means connecting the first external ring and the internal ring comprises at least two elastically deformable beams which extend radially from the internal ring toward the first external ring.

4. A torque sensor according to claim 3, wherein the elastically deformable beams are equidistant with respect to each other.

5. A torque sensor according to claim 3, wherein the elastically deformable beams are irregularly spaced with respect to each other.

6. A torque sensor according to claim 3, wherein the elastically deformable beams have a height and the height of at least one elastically deformable beam varies from a foot of the elastically deformable beam, adjacent to the internal ring, to a head of the elastically deformable beam, adjacent to the first external ring.

7. A torque sensor according to claim 3, wherein the elastically deformable beams have a thickness and the thickness of at least one elastically deformable beam varies from a foot of the elastically deformable beam, adjacent to the internal ring, to a head of the elastically deformable beam, adjacent to the first external ring.

8. A torque sensor according to claim 6, wherein the height of the elastically deformable beams varies identically from the foot of each of the elastically deformable beams to the head of each of the elastically deformable beams, and the elastically deformable beams have a thickness that is constant.

9. A torque sensor according to claim 7, wherein the elastically deformable beams have a thickness and the thickness of the elastically deformable beams varies identically from the foot of each of the elastically deformable beams to the head of each of the elastically deformable beams, the height of the elastically deformable beams being constant.

10. A torque sensor according to claim 6, wherein the height of the elastically deformable beams varies linearly from the base to the head of the elastically deformable beams.

11. A torque sensor according to claim 6, wherein the height of the elastically deformable beams varies in a polynomial manner from the base to the head of the elastically deformable beams.

12. A torque sensor according to claim 7, wherein the thickness of the elastically deformable beams varies in a linear manner from the base to the head of the elastically deformable beams.

13. A torque sensor according to claim 7, wherein the thickness of the elastically deformable beams varies in a polynomial manner from the base to the head of the elastically deformable beams.

14. A torque sensor according to claim 1, wherein the essentially unstressed connection means connecting the second external ring and the internal ring is a beam that extends radially from the internal ring towards the second external ring.

15. A torque sensor according to claim 1, wherein the essentially unstressed connection means connecting the second external ring and the internal ring comprises several beams that are essentially unstressed, and which extend radially from the internal ring to the second external ring.

16. A torque sensor according to claim 15, characterized in that the beams which are essentially unstressed are equidistant from each other.

17. A torque sensor according to claim 15, characterized in that the beams which are essentially unstressed are irregularly spaced with respect to each other.

18. A torque sensor according to claim 15, wherein the beams which are essentially unstressed are essentially arranged in the same radial planes as the deformable beams.

19. A torque sensor according to claim 15, wherein the beams which are essentially unstressed have a geometry that is essentially identical to those of the elastically deformable beams.

20. A torque sensor according to claim 15, wherein the elastically deformable connection means connecting the first external ring and the internal ring comprises elastically deformable beams and the elastically deformable beams and the beams which are essentially unstressed are each four in number.

21. A torque sensor according to claim 1, wherein the elastically deformable connection means connecting the first external ring to the internal ring is a tube which can be deformed in torsion.

22. A torque sensor according to claim 21, wherein the essentially unstressed connection means connecting the second external ring to the internal ring comprises at least one beam that extends radially from the internal ring towards the second external ring.

23. A torque sensor according to claim 22, wherein two radial beams are arranged along a diameter of the second external ring and join the second external ring to the internal ring.

24. A torque sensor according to claim 1, wherein the first external ring, the second external ring, the internal ring and the essentially unstressed connection means are formed as a single piece.

25. A torque sensor according to claim 1, wherein the elastically deformable connection means connecting the first external ring and the internal ring is in the shape of a serpentine coil.

26. A torque sensor according to claim 25, wherein the elastically deformable connection means connecting the first external ring and the internal ring comprises several serpentine coils that are elastically deformable and extend radially from the internal ring towards the first external ring.

27. A torque sensor according to claim 1, wherein the measurement means for measuring the displacement of the first external ring with respect to the second external ring is selected from the group comprising: optical detectors, electromagnetic detectors, capacitive detectors and equivalent detectors.

28. A torque sensor according to claim 27, wherein the measurement means comprises at least one probe with a Hall effect device arranged in a housing of the second external ring.

29. A torque sensor according to claim 27, wherein the measurement means comprises at least one probe with a magnetoresistance device.

30. A steering device for a vehicle, comprising:

a rotatable steering column; and a torque sensor comprising:

a first external ring at least one essentially unstressed connection means for connecting a second external ring; having at least one elastically deformable connection means for connecting the first external ring to an internal ring that is connected to the steering column so the internal ring rotates with the steering column;

a second external ring placed at a distance from the first external ring, the second external ring to the internal ring;

a torque applying means configured for connection to the first external ring; and measurement means, mounted on the second external ring for rotation with the steering column, for measuring a displacement of the first external ring with respect to the second external ring when a torque is applied to the first external ring by the torque applying means.

31. A steering device for a vehicle according to claim 30, further comprising a steering wheel, and wherein the torque sensor forms a hub connected to a steering wheel.

32. A steering device for a vehicle according to claim 30, further comprising a steering wheel, and wherein the torque sensor forms a hub with respect to the steering wheel and the torque sensor consists of a single piece together with the steering wheel.

33. A steering device for a vehicle according to claim 30, further comprising an electronic circuit for processing a signal delivered by the measurement means.

34. A steering device for a vehicle according to claim 33, wherein the signal delivered by the measurement means is adapted to assist braking of the vehicle as a function of the signal delivered by the measurement means and processed by the electronic circuit.

35. A steering device according to claim 34, further comprising a computer and a rotating connector that allows an electrical connection of the electronic circuit to the computer, the electronic circuit being attached to the measurement means and forming an integral part of the measurement means.

* * * * *